US012609112B2

(12) United States Patent
Oktem et al.

(10) Patent No.: US 12,609,112 B2
(45) Date of Patent: *Apr. 21, 2026

(54) MULTI-USER AUTHENTICATION ON A DEVICE

(71) Applicant: GOOGLE LLC, Mountain View, CA (US)

(72) Inventors: Meltem Oktem, Sunnyvale, CA (US); Taral Pradeep Joglekar, Sunnyvale, CA (US); Fnu Heryandi, Sunnyvale, CA (US); Pu-sen Chao, Los Altos, CA (US); Ignacio Lopez Moreno, New York, NY (US); Salil Rajadhyaksha, Santa Clara, CA (US); Alexander H. Gruenstein, Mountain View, CA (US); Diego Melendo Casado, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 18/210,963

(22) Filed: Jun. 16, 2023

(65) Prior Publication Data

US 2023/0335116 A1 Oct. 19, 2023

Related U.S. Application Data

(63) Continuation of application No. 17/584,866, filed on Jan. 26, 2022, now Pat. No. 11,721,326, which is a
(Continued)

(51) Int. Cl.
*G10L 15/08* (2006.01)
*G06F 16/635* (2019.01)
(Continued)

(52) U.S. Cl.
CPC ............ *G10L 15/08* (2013.01); *G06F 16/636* (2019.01); *G06F 21/32* (2013.01); *G06V 40/10* (2022.01);
(Continued)

(58) Field of Classification Search
USPC ................................. 704/246, 247, 251, 275
See application file for complete search history.

(56) References Cited

U.S. PATENT DOCUMENTS 4,363,102 A 12/1982 Holmgren et al.
5,659,665 A 8/1997 Whelpley, Jr. et al.
(Continued)

FOREIGN PATENT DOCUMENTS

CN 101233559 7/2008
CN 104428770 3/2015
(Continued)

OTHER PUBLICATIONS

China National Intellectual Property Administration; Second Office Action issued in application No. 201880016413.5; 5 pages; dated Jun. 1, 2023.
(Continued)

*Primary Examiner* — Leonard Saint-Cyr
(74) *Attorney, Agent, or Firm* — Gray Ice Higdon

(57) ABSTRACT

In some implementations, processor(s) can receive an utterance from a speaker, and determine whether the speaker is a known user of a user device or not a known user of the user device. The user device can be shared by a plurality of known users. Further, the processor(s) can determine whether the utterance corresponds to a personal request or non-personal request. Moreover, and in response to determining that the speaker not a known user of the user device and in response to determining that the utterance corresponds to a non-personal request, the processor(s) can cause
(Continued)

a response to the utterance to be provided for presentation to the speaker at the user device response to the utterance, or can cause an action to be performed by the user device responsive to the utterance.

16 Claims, 10 Drawing Sheets

Related U.S. Application Data continuation of application No. 16/709,132, filed on Dec. 10, 2019, now Pat. No. 11,238,848, which is a continuation of application No. 15/956,350, filed on Apr. 18, 2018, now Pat. No. 10,522,137.

(60) Provisional application No. 62/567,372, filed on Oct. 3, 2017, provisional application No. 62/488,000, filed on Apr. 20, 2017.

(51) Int. Cl.
| | |
|---|---|
| *G06F 21/32* | (2013.01) |
| *G06V 40/10* | (2022.01) |
| *G10L 15/07* | (2013.01) |
| *G10L 15/22* | (2006.01) |
| *G10L 17/00* | (2013.01) |
| *G10L 17/06* | (2013.01) |
| *G10L 15/26* | (2006.01) |

(52) U.S. Cl.
CPC .............. *G10L 15/07* (2013.01); *G10L 15/22* (2013.01); *G10L 17/00* (2013.01); *G10L 17/06* (2013.01); *G10L 2015/088* (2013.01); *G10L 15/26* (2013.01)

(56) References Cited

U.S. PATENT DOCUMENTS

| | | | |
|---|---|---|---|
| 5,895,448 A | 4/1999 | Vysotsky et al. | |
| 5,897,616 A | 4/1999 | Kanevsky et al. | |
| 5,913,196 A | 6/1999 | Talmor et al. | |
| 6,023,676 A | 2/2000 | Erell | |
| 6,094,632 A | 7/2000 | Hattori | |
| 6,141,644 A | 10/2000 | Kuhn et al. | |
| 6,567,775 B1 | 5/2003 | Maali et al. | |
| 6,671,672 B1 | 12/2003 | Heck | |
| 6,744,860 B1 | 6/2004 | Schrage | |
| 6,826,159 B1 | 11/2004 | Shaffer et al. | |
| 6,931,375 B1 | 8/2005 | Bossemeyer, Jr. et al. | |
| 6,973,426 B1 | 12/2005 | Schier et al. | |
| 7,016,833 B2 | 3/2006 | Gable et al. | |
| 7,222,072 B2 | 5/2007 | Chang | |
| 7,226,189 B2 | 6/2007 | Lee et al. | |
| 7,266,189 B1 | 9/2007 | Day | |
| 7,571,014 B1 | 8/2009 | Lambourne et al. | |
| 7,720,012 B1 | 5/2010 | Borah | |
| 7,904,297 B2 | 3/2011 | Mirkovic et al. | |
| 8,099,288 B2 | 1/2012 | Zhang et al. | |
| 8,200,488 B2 | 6/2012 | Kemp et al. | |
| 8,209,174 B2 | 6/2012 | Al-Telmissani | |
| 8,209,184 B1 | 6/2012 | Dragosh et al. | |
| 8,214,447 B2 | 7/2012 | Deslippe et al. | |
| 8,282,404 B1 | 10/2012 | Little et al. | |
| 8,340,975 B1 | 12/2012 | Rosenberger | |
| 8,543,402 B1 | 9/2013 | Ma | |
| 8,588,949 B2 | 11/2013 | Lambourne et al. | |
| 8,595,007 B2 | 11/2013 | Kane | |
| 8,645,137 B2 | 2/2014 | Bellegarda et al. | |
| 8,670,985 B2 | 3/2014 | Lindahl et al. | |
| 8,713,119 B2 | 4/2014 | LIndahl | |
| 8,717,949 B2 | 5/2014 | Crinon et al. | |
| 8,719,009 B2 | 5/2014 | Baldwin et al. | |
| 8,719,018 B2 | 5/2014 | Dinerstein | |

| | | | |
|---|---|---|---|
| 8,768,687 B1 | 7/2014 | Quasthoff et al. | |
| 8,775,191 B1 | 7/2014 | Sharifi et al. | |
| 8,782,404 B2 | 7/2014 | Lamb | |
| 8,805,890 B2 | 8/2014 | Zhang et al. | |
| 8,838,457 B2 | 9/2014 | Cerra et al. | |
| 8,893,243 B2 | 11/2014 | Hald et al. | |
| 8,893,244 B2 | 11/2014 | Counterman | |
| 8,938,394 B1 | 1/2015 | Faaborg et al. | |
| 8,978,100 B2 | 3/2015 | Counterman | |
| 8,996,372 B1 | 3/2015 | Secker-Walker et al. | |
| 9,142,218 B2 | 9/2015 | Schroeter | |
| 9,147,054 B1 | 9/2015 | Beal et al. | |
| 9,286,892 B2 | 3/2016 | Mengibar et al. | |
| 9,418,656 B2 | 8/2016 | Foerster et al. | |
| 9,679,569 B2 | 6/2017 | Foerster et al. | |
| 9,711,148 B1* | 7/2017 | Sharifi .................... G10L 17/04 | |
| 9,747,926 B2 | 8/2017 | Sharifi et al. | |
| 9,767,910 B1 | 9/2017 | Bushnaq et al. | |
| 9,812,128 B2 | 11/2017 | Mixter et al. | |
| 9,916,444 B2 | 3/2018 | Hamid et al. | |
| 9,928,840 B2 | 3/2018 | Sharifi et al. | |
| 9,972,320 B2 | 5/2018 | Melendo et al. | |
| 9,972,323 B2 | 5/2018 | Foerster et al. | |
| 10,008,207 B2 | 6/2018 | Foerster et al. | |
| 10,091,195 B2 | 10/2018 | Lindemann | |
| 10,102,857 B2 | 10/2018 | Mixter et al. | |
| 10,176,310 B2 | 1/2019 | Baghdasaryan | |
| 10,186,268 B2 | 1/2019 | Sharifi | |
| 10,237,070 B2 | 3/2019 | Lindemann | |
| 10,242,676 B2 | 3/2019 | Melendo et al. | |
| 10,497,364 B2 | 12/2019 | Lopez Moreno et al. | |
| 10,521,188 B1* | 12/2019 | Christie .......... H04N 21/42203 | |
| 10,522,137 B2 | 12/2019 | Oktem et al. | |
| 11,087,743 B2 | 8/2021 | Moreno et al. | |
| 11,238,848 B2 | 2/2022 | Oktem et al. | |
| 2002/0049596 A1 | 4/2002 | Burchard et al. | |
| 2002/0072905 A1 | 6/2002 | White et al. | |
| 2002/0123890 A1 | 9/2002 | Kopp et al. | |
| 2002/0143540 A1 | 10/2002 | Malayath et al. | |
| 2002/0193991 A1 | 12/2002 | Bennett et al. | |
| 2003/0200090 A1 | 10/2003 | Kawazoe | |
| 2003/0220797 A1 | 11/2003 | Ito | |
| 2003/0231746 A1 | 12/2003 | Hunter et al. | |
| 2003/0236099 A1 | 12/2003 | Deisher et al. | |
| 2004/0101112 A1 | 5/2004 | Kuo | |
| 2004/0158457 A1 | 8/2004 | Veprek et al. | |
| 2004/0230420 A1 | 11/2004 | Kadambe et al. | |
| 2005/0135583 A1 | 6/2005 | Kardos et al. | |
| 2005/0165607 A1 | 7/2005 | Di Fabbrizio et al. | |
| 2006/0074656 A1 | 4/2006 | Mathias et al. | |
| 2006/0085188 A1 | 4/2006 | Goodwin et al. | |
| 2006/0184370 A1 | 8/2006 | Kwak et al. | |
| 2007/0100620 A1 | 5/2007 | Tavares | |
| 2007/0198262 A1 | 8/2007 | Mindlin et al. | |
| 2007/0198849 A1 | 8/2007 | Mozer | |
| 2008/0046241 A1 | 2/2008 | Osburn | |
| 2009/0240488 A1 | 9/2009 | White et al. | |
| 2009/0258333 A1 | 10/2009 | Yu | |
| 2009/0292541 A1 | 11/2009 | Daya et al. | |
| 2010/0070276 A1 | 3/2010 | Wasserblat et al. | |
| 2010/0110834 A1 | 5/2010 | Kim et al. | |
| 2011/0026722 A1 | 2/2011 | Jing et al. | |
| 2011/0054892 A1 | 3/2011 | Jung | |
| 2011/0060587 A1 | 3/2011 | Phillips et al. | |
| 2011/0066429 A1 | 3/2011 | Shperling et al. | |
| 2011/0184730 A1 | 7/2011 | LeBeau et al. | |
| 2011/0282661 A1 | 11/2011 | Dobry et al. | |
| 2011/0286586 A1* | 11/2011 | Saylor ............... H04M 1/72436 379/88.13 |
| 2011/0304648 A1 | 12/2011 | Kim et al. | |
| 2012/0084087 A1 | 4/2012 | Yang et al. | |
| 2012/0136923 A1 | 5/2012 | Grube | |
| 2012/0232896 A1 | 9/2012 | Taleb et al. | |
| 2012/0245941 A1 | 9/2012 | Cheyer | |
| 2012/0265528 A1 | 10/2012 | Gruber et al. | |
| 2013/0006634 A1 | 1/2013 | Grokop et al. | |
| 2013/0024196 A1 | 1/2013 | Ganong, III et al. | |
| 2013/0060571 A1 | 3/2013 | Soemo et al. | |
| 2013/0124207 A1 | 5/2013 | Sarin et al. | |

(56) References Cited

U.S. PATENT DOCUMENTS

| | | | |
|---|---|---|---|
| 2013/0132086 A1 | 5/2013 | Xu et al. | |
| 2013/0139235 A1 | 5/2013 | Counterman | |
| 2013/0183944 A1 | 7/2013 | Mozer et al. | |
| 2013/0262873 A1 | 10/2013 | Read et al. | |
| 2013/0325484 A1 | 12/2013 | Chakladar et al. | |
| 2014/0006825 A1 | 1/2014 | Shenhav | |
| 2014/0012573 A1 | 1/2014 | Hung et al. | |
| 2014/0012578 A1 | 1/2014 | Morioka | |
| 2014/0074471 A1 | 3/2014 | Sankar et al. | |
| 2014/0088961 A1 | 3/2014 | Woodward et al. | |
| 2014/0163978 A1 | 6/2014 | Basye et al. | |
| 2014/0222430 A1 | 8/2014 | Rao | |
| 2014/0257821 A1 | 9/2014 | Adams et al. | |
| 2014/0278383 A1 | 9/2014 | Fan | |
| 2014/0278435 A1 | 9/2014 | Ganong, III et al. | |
| 2014/0337032 A1 | 11/2014 | Aleksic et al. | |
| 2015/0081295 A1 | 3/2015 | Yun et al. | |
| 2015/0154953 A1 | 6/2015 | Bapat et al. | |
| 2015/0228274 A1 | 8/2015 | Leppanen et al. | |
| 2015/0262577 A1 | 9/2015 | Nomura | |
| 2015/0279360 A1 | 10/2015 | Mengibar et al. | |
| 2015/0371639 A1 | 12/2015 | Foerster et al. | |
| 2015/0379989 A1 | 12/2015 | Balasubramanian et al. | |
| 2016/0104483 A1 | 4/2016 | Foerster et al. | |
| 2016/0155443 A1 | 6/2016 | Khan et al. | |
| 2016/0174074 A1 | 6/2016 | Kim et al. | |
| 2016/0189715 A1 | 6/2016 | Nishikawa | |
| 2016/0217790 A1 | 7/2016 | Sharifi | |
| 2016/0260431 A1 | 9/2016 | Newendorp et al. | |
| 2017/0025124 A1 | 1/2017 | Mixter et al. | |
| 2018/0082502 A1* | 3/2018 | Browning | G07C 9/00309 |
| 2018/0232201 A1* | 8/2018 | Holtmann | G06V 40/10 |
| 2018/0293981 A1* | 10/2018 | Ni | G10L 15/08 |
| 2018/0308472 A1 | 10/2018 | Moreno et al. | |
| 2018/0308491 A1 | 10/2018 | Oktem et al. | |
| 2022/0148577 A1 | 5/2022 | Oktem et al. | |

FOREIGN PATENT DOCUMENTS

| | | |
|---|---|---|
| CN | 104854654 | 8/2015 |
| CN | 105453080 | 3/2016 |
| EP | 1511277 | 3/2005 |
| EP | 3125234 | 2/2017 |
| JP | S59180599 | 10/1984 |
| JP | H09127973 | 5/1997 |
| JP | H1152976 | 2/1999 |
| JP | H11231896 | 8/1999 |
| JP | 2000075954 | 3/2000 |
| JP | 2000310999 | 11/2000 |
| JP | 2006227634 | 8/2006 |
| JP | 2009104020 | 5/2009 |
| JP | 201492777 | 5/2014 |
| KR | 20140031391 | 3/2014 |
| KR | 20160071111 | 6/2016 |
| KR | 20160101198 | 8/2016 |
| KR | 20160147955 | 12/2016 |
| KR | 20170004956 | 1/2017 |
| KR | 20170012188 | 2/2017 |
| KR | 20170094415 | 8/2017 |
| KR | 20170131585 | 11/2017 |
| WO | 9822936 | 5/1998 |
| WO | 1998040875 | 9/1998 |
| WO | 2013006385 | 1/2013 |
| WO | 2014008194 | 1/2014 |
| WO | 2015025330 | 2/2015 |
| WO | 2015199813 | 12/2015 |

OTHER PUBLICATIONS

Korean Patent Office; Office Action issued in Application No. KR10-2022-7036565; 6 pages; dated Apr. 28, 2023.

European Patent Office; Communication pursuant to Article 94(3) EPC issued in Application No. 21167020.3; 6 pages; dated Apr. 21, 2023.

China National Intellectual Property Administration; First Office Action issued in application No. 201880016413.5; 17 pages; dated Nov. 30, 2022.

The Korean Intellectual Property Office: Notice of Allowance issued in Application No. 10-2021-7035224, 4 pages, dated Jul. 21, 2022.

Korean Patent Office; Office Action issued in Application No. KR10-2021-7035224; 6 pages; dated Jan. 28, 2022.

European Patent Office; Communication issued in Application No. 21167020.3; 11 pages; dated Sep. 30, 2021.

Korean Patent Office; Notice of Allowance issued in Application No. 10-2019-7026114; 3 pages; dated Jul. 28, 2021.

"Speaker Recognition", Wikipedia, the free encyclopedia, 5 pages, last modified on Jan. 30, 2014; downloaded from the internet on May 15, 2014, http://en.wikipedia.org/wiki/Speaker_recognition> 5 pages.

"Voice Biometrics Evaluations Studio 8.2 :: Product Description", Customer Care Solutions from Nuance, 2012, 6 pages.

Auckenthaler et al. "Score Normalization for Text-independent Speaker Verification System," Digital Signal Processing, vol. 10, 2000, 13 pages.

Germain, Francois G. et al., "Speaker and Noise Independent Voice Activity Detection", Mar. 26, 2013. 9 pages.

Hurmalainen, Antti et al., "Detection, Separation and Recognition of Speech from Continuous Signals Using Spectral Factorisation", 20th European Signal Processing Conference (EUSIPCO 2012), Bucharest, Romania, Aug. 27-31, 2012, 5 pages.

Jae-Seung, Choi, "Text-dependent Speaker Recognition using Characteristic Vectors in Speech Signal and Normalized Recognition Method," Journal of Korean Institute of Information Technology, 10(5), May 2012 (English Abstract).

Kim, Youngmoo E. et al., "Comparison of a Joint Iterative Method for Multiple Speaker Identification with Sequenstial Blind Source Separation and Speaker Identification", Proceedings of the 2008 IEEE Odyssey Workshop on Speaker and Language Recognition, Stellenbosch, South Africa, 8 pages.

Kotti, Margarita et al., "Speaker Segmentation and Clustering", Preprint submitted to Elsevier Preprint Oct. 31, 2007, 54 pages.

Kwon, Soonil et al., "Unsupervised Speaker Indexing Using Generic Models", IEEE Transaction on Speech and Audio Processing, vol. 13, No. 5, Sep. 2005, 10 pages.

Maes, Stephanie H. et al., "Conversational Speech Biometrics," J. Liu and Y. Ye (Eds.): E-Commerce Agents, LNAI 2033, Springer-Verlag, Berlin Heidelberg 2001, 14 pages.

Navratil, U.V. et al., "A Speech Biometrics System with Multi-Grained Speaker Modeling", 2000, 5 pages.

Ramfrez, Javier et al., "Statistical Voice Activity Detection Using a Multiple Observation Likelihood Ratio Test", IEEE Signal Processing Letters, vol. 12, No. 10, Oct. 2005, 4 pages.

Schabus, Deitmar et al., "Objective and Subjective Feature Evaluation for Speaker-Adaptive visual Speech Synthesis", International Conference on Auditory-Visual Processing, 2013, 6 pages.

Walsh, John MacLaren et al., Joint Iterative Multi-Speaker Identification and Source Separation Using Expectation Propagation:, Proceedings of the 2007 IEEE Workshop on Applications of Signal Processing to Audio and Acoustics, New Paltz, NY, 4 pages.

European Patent Office; Preliminary Report on Patentability issued in Application No. PCT/US2018/028149; 7 pages; dated Oct. 22, 2019.

European Patent Office; International Search Report issued in Application No. PCT/US2018/028149; 13 pages; dated Jul. 4, 2018.

European Patent Office; Communication issued in Application No. 23207530.9; 9 pages; dated Jan. 19, 2024.

* cited by examiner

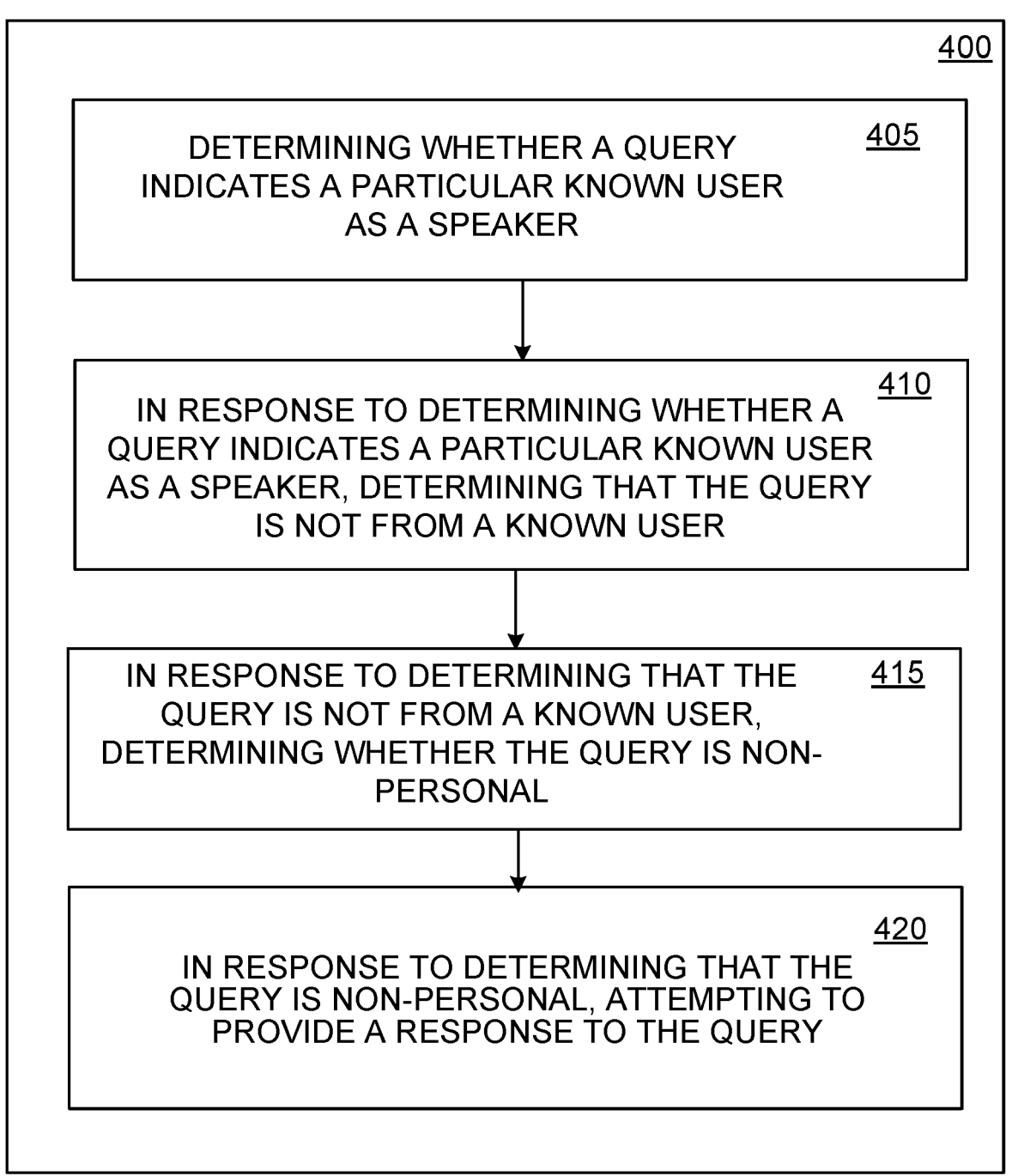

400

DETERMINING WHETHER A QUERY INDICATES A PARTICULAR KNOWN USER AS A SPEAKER    405

IN RESPONSE TO DETERMINING WHETHER A QUERY INDICATES A PARTICULAR KNOWN USER AS A SPEAKER, DETERMINING THAT THE QUERY IS NOT FROM A KNOWN USER    410

IN RESPONSE TO DETERMINING THAT THE QUERY IS NOT FROM A KNOWN USER, DETERMINING WHETHER THE QUERY IS NON-PERSONAL    415

IN RESPONSE TO DETERMINING THAT THE QUERY IS NON-PERSONAL, ATTEMPTING TO PROVIDE A RESPONSE TO THE QUERY    420

FIG. 4

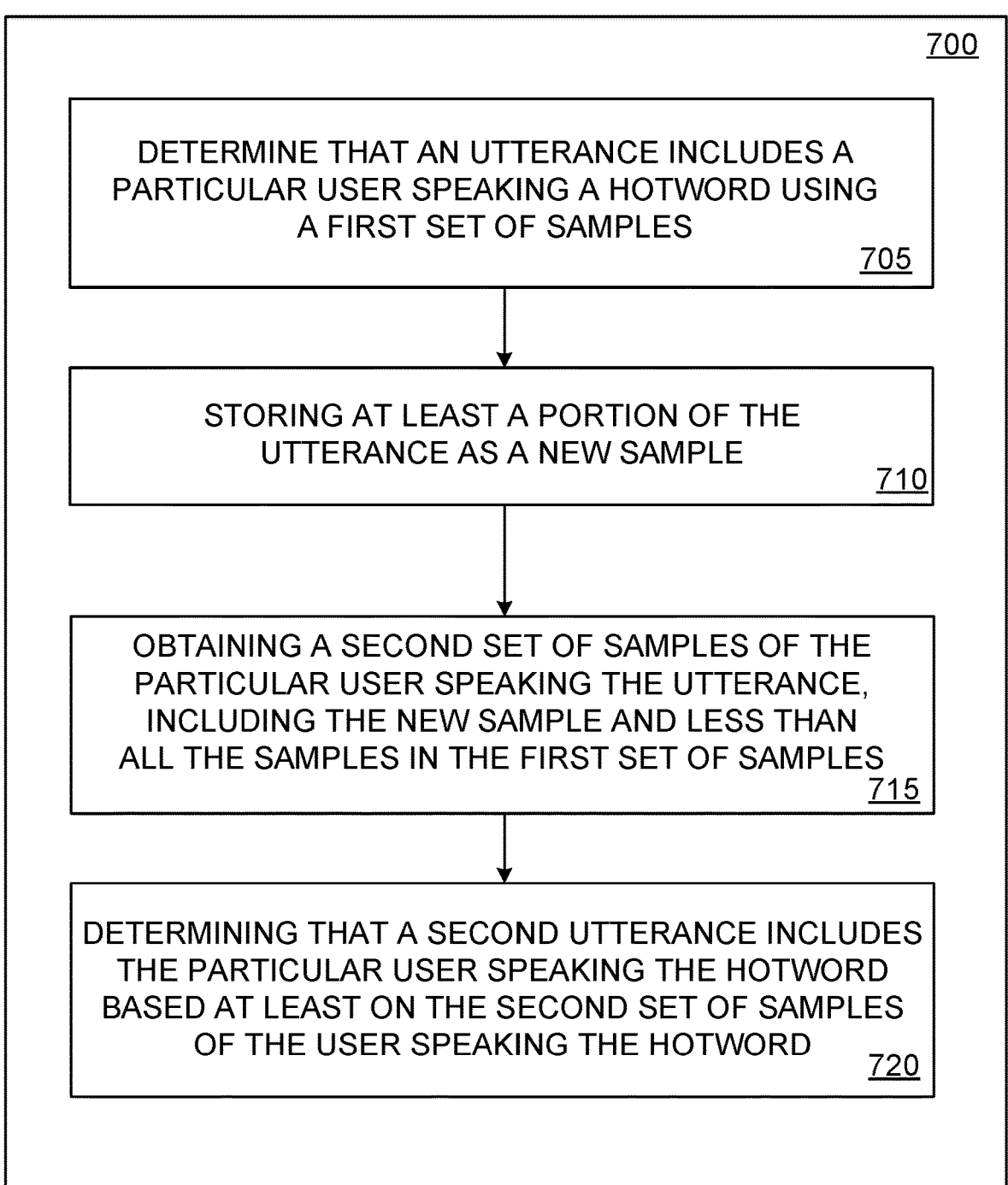

700

DETERMINE THAT AN UTTERANCE INCLUDES A
PARTICULAR USER SPEAKING A HOTWORD USING
A FIRST SET OF SAMPLES

705

STORING AT LEAST A PORTION OF THE
UTTERANCE AS A NEW SAMPLE

710

OBTAINING A SECOND SET OF SAMPLES OF THE
PARTICULAR USER SPEAKING THE UTTERANCE,
INCLUDING THE NEW SAMPLE AND LESS THAN
ALL THE SAMPLES IN THE FIRST SET OF SAMPLES

715

DETERMINING THAT A SECOND UTTERANCE INCLUDES
THE PARTICULAR USER SPEAKING THE HOTWORD
BASED AT LEAST ON THE SECOND SET OF SAMPLES
OF THE USER SPEAKING THE HOTWORD

MULTI-USER AUTHENTICATION ON A DEVICE

FIELD

This specification generally relates to natural language processing.

BACKGROUND

Speech-enabled devices may provide audible answers to spoken utterances from users. Such devices are often the front-end for so-called digital assistant software or "digital assistants" or "virtual assistants". Such devices often provide a limited amount of speech recognition functionality themselves, and communicate with a server or other device for additional resources. Further, such devices often receive data from the server or other device (e.g., in response to a voice-entered query or utterance) that is converted into audible synthesized speech for the user. For example, a user may say "Will it rain today?" and a speech-enabled device may audibly respond, "It will be sunny all day." A user may provide an utterance that relates to the user's personal information. For example, a user might ask the system "What is on my calendar" and the device may respond with appointments on a calendar associated with the device. However, common speech enabled devices do not adequately distinguish between various users, especially as related to secure access to a specific user's personal information, while still permitting general use of the speech enabled device by, for example, guest users.

SUMMARY

A speech-enabled device may be used by multiple different users. For example, a speech-enabled device placed on a kitchen counter top may be used by John and Jane Doe in a home. Users of the speech-enabled device may ask questions that are related to the user's personal information. For example, John and Jane Doe may separately ask the speech-enabled device what's scheduled for their respective day. Users other than John and Jane Doe (i.e., "guests") may also ask the speech-enabled device questions that are not related to the user's personal information. For example, a guest user may ask the speech-enabled device what is the current time.

To handle utterances from multiple different users, a speech-enabled device may attempt to identify a speaker of an utterance as a particular user, and if successful, provide a query to a server with an indication corresponding to the identified particular user, and if not successful, provide a query to a server without an indication corresponding to the identified particular user. For example, the speech-enabled device may recognize an utterance as spoken by "John Doe" based on recognizing the utterance as matching a pre-established speech pattern from "John Doe," and, in response, provide a query to the server that includes both an audio representation of the utterance and an indication that the utterance was spoken by "John Doe."

This combination permits the virtual assistant software to access John Doe's personal information to provide a response to the query. A query re-write may also occur to facilitate this access (e.g., writing the initial query of "what's on the schedule for the day" to "what is on [identified user]'s schedule for [date]." Simultaneously, the system is configured to permit processing of queries by parties not otherwise recognized (e.g., a guest user) by providing to the server either simply the utterance, the utterance and the identification ("id") of one or more possible speakers but without confirmation that a speaker has been identified, or an utterance and some other indication such as a device id.

A server may use the indication of the particular user, or lack of such an indication, to generate a response to the query. For example, the server may determine, based on receipt of the indication that the utterance was spoken by John Doe, that it has authority to provide appropriate personal information in response to the query. In the example request for what is on the schedule for the day, this means the server may provide to the speech enabled device for vocalization a listing or summary of appointments for John Doe. Where the server determines a query does not indicate identification of a particular user, yet the query is seeking personal information, the server may indicate an answer can't be provided as the user is not known to the speech-enabled device. In yet another example, the server may determine that even though a query corresponding to an utterance (e.g., "What time is it") does not indicate a particular user, the query is not related to personal information and a reply may be provided (e.g., "It is now 11 AM") to the speech-enabled device.

The speech-enabled device may adapt recognition of voices of users as the users provide queries. For example, to recognize users the speech-enabled device may use a combination of samples of a user speaking during a registration process and recent samples of a user providing queries. The speech-enabled device may generate a new sample for a respective user from a query after the device determines the respective user spoke the query, and then use the new sample and stop using an older sample for future recognition. Additionally or alternatively, the samples may be shared across multiple different speech-enabled devices used by a particular user so that each of the devices similarly recognize when the particular user is providing a query.

In some aspects, the subject matter described in this specification may be embodied in methods that may include the actions of storing authentication tokens corresponding to known users of a device, receiving an utterance from a speaker, classifying the utterance as spoken by a particular known user of the known users, and providing a query that includes a representation of the utterance and an indication of the particular known user as the speaker using the authentication token of the particular known user.

In some aspects, providing a query that includes a representation of the utterance and an indication of the particular known user as the speaker using the authentication token of the particular known user includes providing a query that includes the authentication tokens and a flag that indicates the utterance was classified as spoken by the particular known user. In certain aspects, providing a query that includes a representation of the utterance and an indication of the particular known user as the speaker using the authentication token of the particular known user includes providing a query that includes an authentication token of the particular known user, where inclusion of the authentication token of the particular known user in the query indicates that the utterance was classified as spoken by the particular known user. In some implementations, storing authentication tokens corresponding to known users of a device includes storing an authentication token for each of the known users of the device, where each of the authentication tokens corresponds to a respective one of the known users. In some aspects, storing authentication tokens corresponding to known users of a device is in response to users registering as known users of a speech-enabled device.

In certain aspects, classifying the utterance as spoken by a particular known user of the known users includes determining that the utterance matches speech corresponding to the particular known user. In some implementations, determining that the utterance matches speech corresponding to the particular known user includes determining that the utterance includes a predetermined phrase and in response to determining that the utterance includes the predetermined phrase, determining that the utterance of the predetermined phrase matches a prior utterance of the predetermined phrase by the particular known user. In some aspects, classifying the utterance as spoken by a particular known user of the known users includes determining that visual information corresponding to the speaker matches visual information corresponding to the particular known user.

In certain aspects, determining that visual information corresponding to the speaker matches visual information corresponding to the particular known user includes receiving speaker information describing one or more of the speaker's fingerprint, retina scan, face, or posture and determining that the speaker information matches visual information corresponding to the particular known user. In some aspects, providing a query that includes a representation of the utterance and an indication of the particular known user as the speaker includes providing the query to a server. In some implementations, operations include receiving a response to the query from a server and providing the response to the speaker.

In some aspects, the subject matter described in this specification may be embodied in methods that may include the actions of storing authentication tokens corresponding to known users of a device, receiving an utterance from a speaker, classifying the utterance as not spoken by any of the known users, and providing a query that includes a representation of the utterance and that does not indicate that the utterance was classified as spoken by a particular known user of the known users. In certain aspects, providing a query that includes a representation of the utterance and that does not indicate that the utterance was classified as spoken by a particular known user of the known users includes providing a query that includes the authentication tokens and no flag that indicates the utterance was classified as spoken by a particular known user of the known users. In some implementations, providing a query that includes a representation of the utterance and that does not indicate that the utterance was classified as spoken by a particular known user of the known users includes providing a query that does not include an authentication token of any of the known users.

In some aspects, the subject matter described in this specification may be embodied in methods that may include the actions of determining whether a query indicates a particular known user as a speaker, in response to determining whether a query indicates a particular known user as a speaker, determining that the query is not from a known user, in response to determining that the query is not from a known user, determining whether the query is non-personal, and in response to determining that the query is non-personal, attempting to provide a response to the query. In certain aspects, determining whether a query indicates a particular known user as a speaker includes determining whether the query that includes a flag that indicates the utterance was classified as spoken by the particular known user. In some implementations, determining whether a query indicates a particular known user as a speaker includes determining whether the query that includes an authorization token of the particular known user. In some aspects, in response to determining that the query is not from a known user, determining whether the query is non-personal includes in response to determining that the query is not from a known user, determining whether an answer to the query is dependent on personal information.

In some aspects, the subject matter described in this specification may be embodied in methods that may include the actions of determining that an utterance includes a particular user speaking a hotword based at least on a first set of samples of the particular user speaking the hotword, in response to determining that an utterance includes a particular user speaking a hotword based at least on a first set of samples of the particular user speaking the hotword, storing at least a portion of the utterance as a new sample, obtaining a second set of samples of the particular user speaking the utterance, where the second set of samples includes the new sample and less than all the samples in the first set of samples, and determining that a second utterance includes the particular user speaking the hotword based at least on the second set of samples of the user speaking the hotword.

In certain aspects, obtaining a second set of samples of the particular user speaking the utterance, where the second set of samples includes the new sample and less than all the samples in the first set of samples includes selecting a predetermined number of recently stored samples as the second set of samples. In some aspects, obtaining a second set of samples of the particular user speaking the utterance, where the second set of samples includes the new sample and less than all the samples in the first set of samples includes selecting both a predetermined number of most recently stored samples and a set of reference samples to combine together as the second set of samples. In some implementations, the reference samples include samples from a registration process for the particular user and the most recent stored samples include samples from queries spoken by the particular user.

In certain aspects, actions include in response to obtaining the second set of samples, deleting a sample in the first set of samples but not in the second set of samples. In some aspects, determining that an utterance includes a particular user speaking a hotword based at least on a first set of samples of the particular user speaking the hotword includes generating a hotword detection model using the first set of samples, inputting the utterance to the hotword detection model, and determining that the hotword detection model has classified the utterance as including the particular user speaking the hotword. In some implementations, determining that a second utterance includes the particular user speaking the hotword based at least on the second set of samples of the user speaking the hotword includes generating a second hotword detection model using the second set of samples, inputting the second utterance to the second hotword detection model, and determining that the second hotword detection model has classified the second utterance as including the particular user speaking the hotword.

In certain aspects, actions include receiving a second new sample from a server and determining that a third utterance includes the particular user speaking the hotword based at least on a third set of samples that includes the second new sample from the server and less than all the samples in the second set of samples. In some aspects, actions include receiving, from a server, indications of samples in a third set of samples, determining samples that are in the third set of samples that are not locally stored, providing a request to server for the samples in the third set of samples that are not locally stored, and receiving the samples that are not locally stored from the server in response to the request.

In some implementations, actions include providing the first set of samples to a voice-enabled device to enable the voice-enabled device to detect whether the particular user says the hotword, where determining that an utterance includes a particular user speaking a hotword based at least on a first set of samples of the particular user speaking the hotword includes receiving an indication that the voice-enabled device detected that the particular user said the hotword. In certain aspects, actions include generating a hotword detection model using the first set of samples and providing the hotword detection model to a voice-enabled device to enable the voice-enabled device to detect whether the particular user says the hotword, where determining that an utterance includes a particular user speaking a hotword based at least on a first set of samples of the particular user speaking the hotword includes receiving an indication that the voice-enabled device detected that the particular user said the hotword.

In some implementations, actions include receiving, from a voice-enabled device, a request for a current set of samples for detecting whether the particular user said the hotword, determining samples in the current set of samples that are not locally stored by the voice-enabled device, and providing, to the voice-enabled device, an indication of the samples in the current set of samples and the samples in the current set of samples that are not locally stored by the voice-enabled device.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. For example, by having the speech-enabled device provide queries to a server that include an authentication token speaker of an utterance, the system may enable the speech-enabled device to be shared by multiple different users and provide responses that are personalized to the speaker of the utterance. In another example, by having queries that include multiple or all authorization tokens for users stored on the speech-enabled device and indicating which authorization token corresponds to the speaker, or whether no authorization token corresponds to the speaker, the system may enable services to be shared between users of the shared speech-enabled device. For instance, if a server that processes queries receives a query with a pool of tokens that includes an authentication token for a particular user that is permitted to use a music streaming service, even if the query does not indicate that the particular user spoke the utterance, the server may still permit the music streaming service to be used in response to the query given the presence of the authentication token for the particular user. Accordingly, the system may secure access to a specific user's personal information while still permitting general use of the speech enabled device by, for example, guest users. The system may therefore address problems associated with data security. The system may additionally or alternatively address problems associated with how to provide personalized user interaction on a device used by multiple different users.

In another example, by having the system obtain different sets of samples based on new samples of users speaking an utterance, the system may ensure accuracy in detecting when a particular known user speaks an utterance even when the voice, accent, environment, or other factor changes in the audio received by the speech-enabled device. In still another example, by having the system transmit samples between multiple different speech-enabled devices, the system may enable users to save time by not having to speak to provide reference samples for each of the speech-enabled devices and may also ensure that each of the speech-enabled devices similarly detect a known user speaking a hotword. Accordingly, processing needed for a user to provide reference samples by speaking after a first registration may be saved. For example, the system may ensure that if a particular utterance is recognized as being spoken on one speech-enabled device of the known user, then all speech-enabled devices of the known user would similarly recognize the particular utterance as being spoken by the known user. Accordingly, consistency and predictability for the known user may be increased.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

FIG. 4 is a flow diagram that illustrates an example of a process for handling a query from a speech-enabled device.

FIG. 7 is a flow diagram that illustrates an example of a process for updating a set of samples used for speaker identification.

Like reference numbers and designations in the various drawings indicate like elements.

DETAILED DESCRIPTION

Figure 1A:
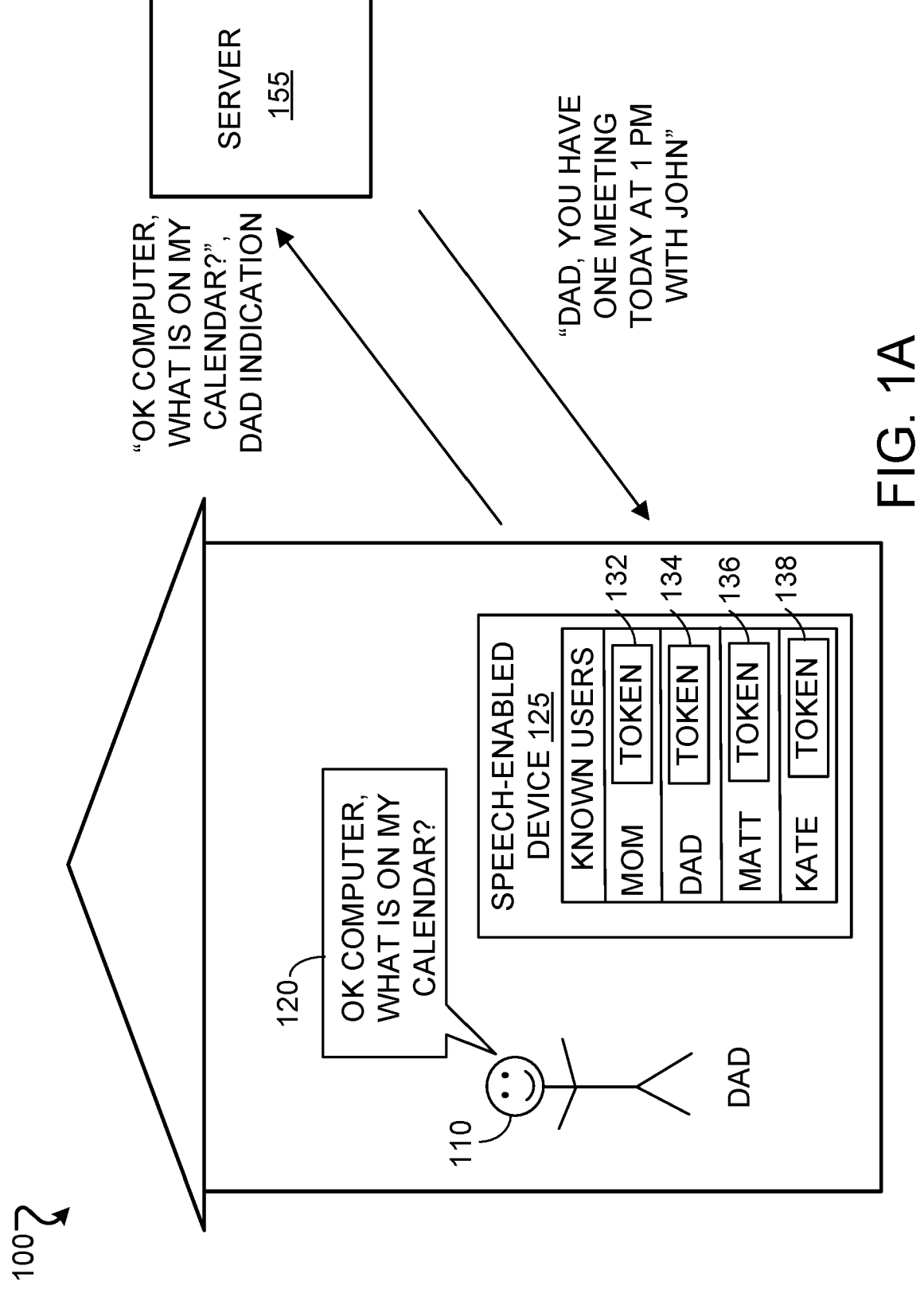
FIG. 1A, FIG. 1B, & FIG. 1C are block diagrams that illustrate example interactions with a speech-enabled device.
Figure 1B:
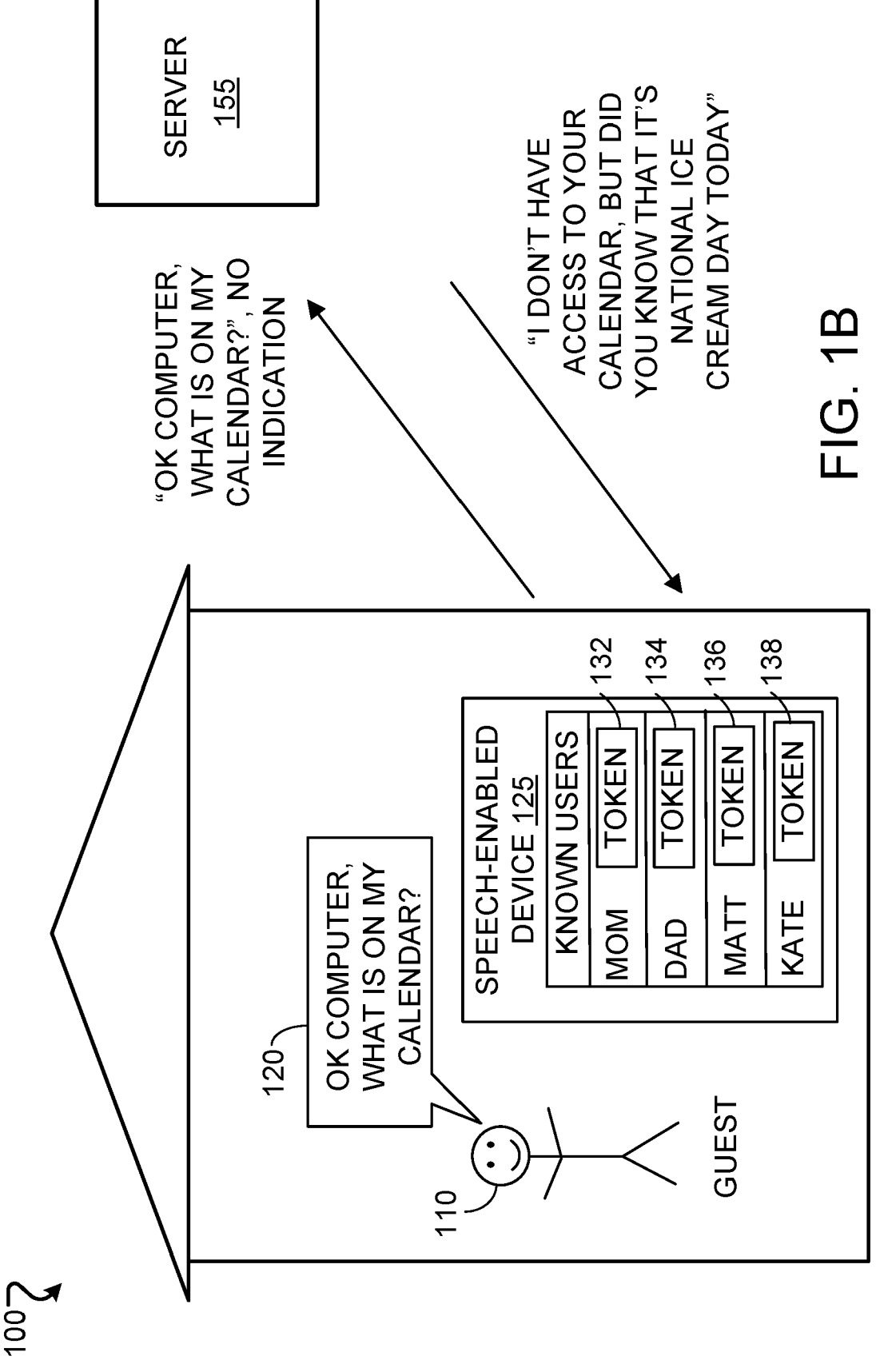
Figure 1C:
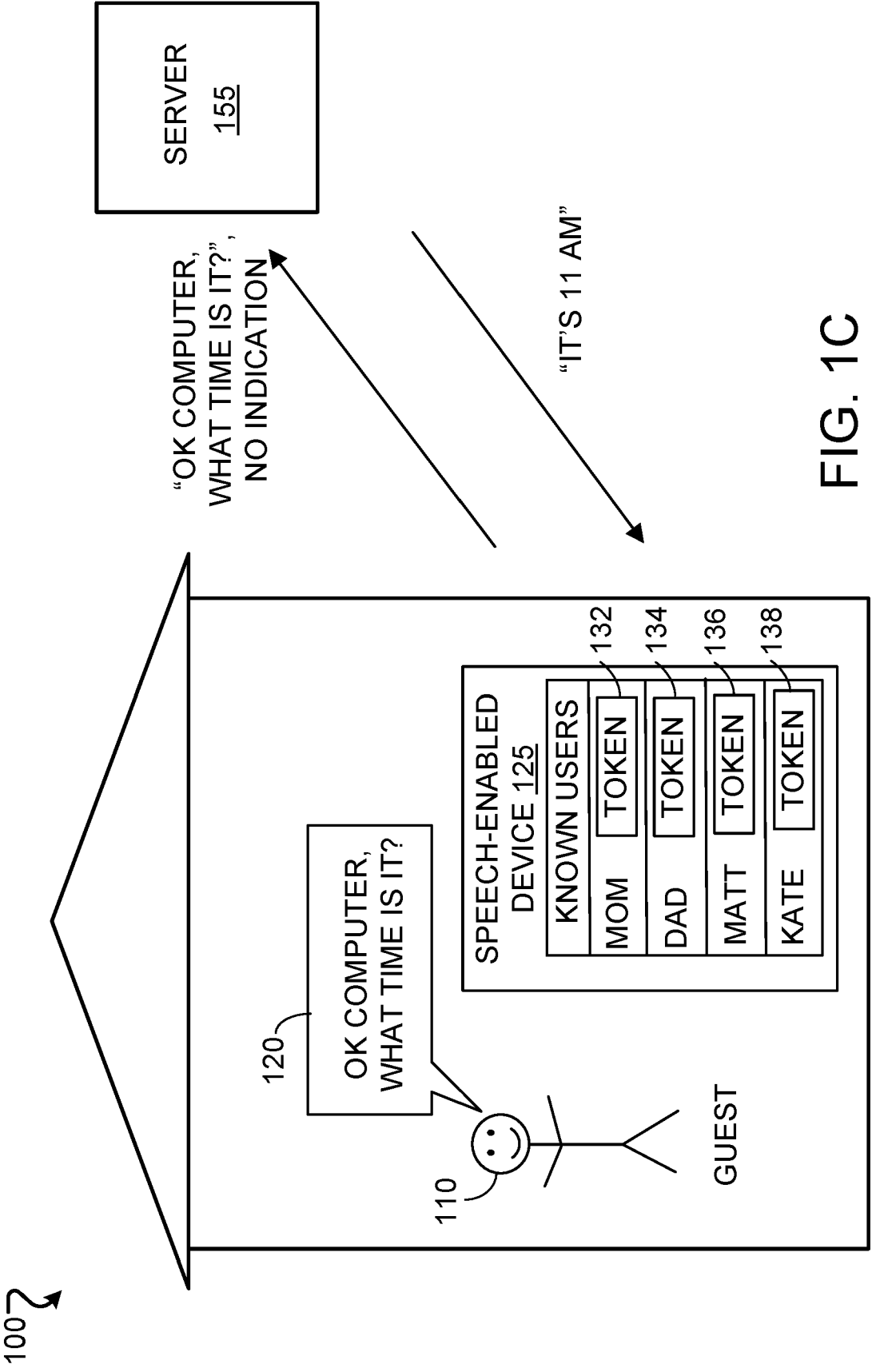

FIGS. 1A-1C are block diagrams that illustrate different example interactions in system 100. System 100 includes a speech-enabled device 125 and a server 155. The speech-enabled device 125 and the server 155 may work together to provide responses to an utterance 120 made by the user 110. For example, the speech-enabled device 125 may provide queries to the server based on utterances spoken by users in proximity to the speech-enabled device 125. The server 155 may then provide responses to the utterances to the speech-enabled device 125.

In some implementations, the speech-enabled device 125 may provide the server 155 queries in response to detecting an utterance including a predetermined phrase, also referred to as a hotword, that a user speaks to initiate a response from the system 100. For example, a hotword may be "OK Computer" or some other phrase.

To handle utterances from multiple users, the speech-enabled device 125 may classify utterances as spoken by particular known users, and provide queries to the server that indicate the particular known users classified as speaking the utterances. A known user may be a user that is registered as a user of the system 100 and guest user may be a user that is not registered as a user of the system 100. For example, "Dad" may register as a known user of the speech-enabled device 125, and the speech-enabled device 125 may later classify whether an utterance is spoken by the known user "Dad." The server 155 may use the indication of a particular known user in a query, or lack of such an indication in a query, to generate a response to the query.

For example, FIG. 1A illustrates an utterance "OK Computer, what is on my calendar" spoken by a known user "Dad." The speech-enabled device 125 provides a query to the server 155, where the query includes a representation of the utterance and an indication that the utterance was classified as spoken by the known user "Dad." The server 155 generates a response "Dad, you have one meeting today at 1 PM with John" based on the indication of the known user "Dad."

In another example, FIG. 1B illustrates an utterance "OK Computer, what is on my calendar" spoken by a guest user. The speech-enabled device 125 provides a query to the server 155, where the query includes a representation of the utterance and does not include an indication that the utterance was classified as spoken by any known user of the speech-enabled device 125. The server 155 then generates a response "I don't have access to your calendar, but did you know that it's national ice cream day today" based on the absence of the indication that the utterance was classified as spoken by any known user of the speech-enabled device 125.

In yet another Example, FIG. 1C illustrates an utterance "OK Computer, what time is it" spoken by a guest user. The speech-enabled device 125 provides a query to the server 155, where the query includes a representation of the utterance and does not include an indication that the utterance was classified as spoken by any known user of the speech-enabled device 125. The server 155 then generates a response "It's 11 AM" and provides the same to speech-enabled device 125 based on determining that although no known user was indicated as speaking, and that the query is not related to personal information.

In more detail, the speech-enabled device 125 may include one or more microphones and one or more speakers. The speech-enabled device 125 may receive utterances using the one or more microphones and output audible responses to the utterances through the one or more speakers.

The speech-enabled device 125 may store authentication tokens corresponding to respective known users. For example, the speech-enabled device may store a first authentication token 132 for a first known user "Mom," a second authentication token 134 for a second known user "Dad," a third authentication token 136 for a third known user "Matt," and a fourth authentication token 138 for a fourth known user "Kate."

The authentication token of a user may be a data structure that serves as a log-in for an account of the user in the system 100. For example, a query that includes the authentication token for known user "Dad" 134 and indicates that "Dad" is classified as a speaker may enable access to information in the account of "Dad." The authentication tokens may indicate actions that may be performed in response to utterances. For example, an account of a known user "Dad" may have authorization to play music from "Provider X," so a query to play music from "Provider X" that includes the authorization token for "Dad" 134 may result in music being played from "Provider X." In another example, a query to play music from "Provider X" that does not include the authorization token for any known user that has an account that is authorized to play music from "Provider X," not just a current speaker, may result in no music being played.

In some implementations, the speech-enabled device 125 may store an authentication token for a known user in response to a user registering as a known user of the speech-enabled device. For example, users "Mom," "Dad," "Matt," and "Kate," may be explicitly registered as known users of the speech-enabled device 125. In the registration process, the speech-enabled device 125 may receive the authentication tokens for the known users from the server 155. For example, when "Dad" is registered as a known user of the speech-enabled device 125, the server 155 may provide the authentication token for "Dad" 134 to the speech-enabled device 125. In the registration process, the speech-enabled device 125 may also store contextual information that can be used to identify a speaker as a known user. For example, when "Dad" is registered as a known user of the speech-enabled device 125, the speech-enabled device 125 may request that "Dad" speak a hotword multiple times, and then locally store speaker identification features corresponding to the utterances of the hotword.

In some implementations, a user may register as a known user through a companion application on a mobile computing device where the mobile computing device is in communication with the speech-enabled device 125 via a local wireless connection. For example, the user may log into an account of the user's through the companion application on a smartphone, then indicate in the companion application that the user would like to register as a known user of the speech-enabled device 125, and then say a hotword multiple times into the mobile computing device. The companion application may then cause the authentication for the user to be stored on the speech-enabled device 125 along with speaker identification features based on the user saying the hotword.

In some implementations, the speech-enabled device 125 may include an indication of a particular known user in a query based on including a flag on the authentication token for the particular known user in the query. For example, the speech-enabled device 125 may include all authentication tokens (referred to herein as a "pool") stored on the speech-enabled device 125 in a query, and set a flag for only the authentication tokens the speech-enabled device 125 classifies as an utterance spoken by the identified known user corresponding to the authentication token.

In such implementations, the pool of authentication tokens may be used by the server 155 to handle queries where answers are not dependent on personal information of known users. For example, a query may be "Play music from X service" and the server 155 may examine the authentication tokens in the query to attempt to identify an authentication token from the pool associated with a known user that does have rights to "Play music from X service." If the server 155 identifies at least one authentication token with rights to "Play music from X service," then the server 155 may play music from "X service." In this example, including all authentication tokens as a pool in a query may permit any user of the speech-enabled device 125, including guest users, to have the speech-enabled device 125 may play music from "X service."

In some implementations, the speech-enabled device 125 may include an indication of a particular known user in a query by including the authentication token for the particular known user in the query (i.e., without including a flag). For example, in some implementations the speech-enabled device 125 only includes an authentication token in a query when the speech-enabled device 125 classifies an utterance as spoken by a known user corresponding to the authentication token. In such implementations, when there is an utterance from a guest user that does not correspond to a known user, the speech-enabled device 125 classifies the utterance as not spoken by any of the known users and provides the server 155 with a query that does not include any authentication tokens.

In some implementations, the speech-enabled device 125 may store a device authentication token that indicates rights that the speech-enabled device 125 may have, and include the device authentication token in queries to the server 155. For example, if the speech-enabled device 125 stores an authentication token for a known user that is authorized to play music from "Provider X," the speech-enabled device 125 may store a device authentication token that indicates that the speech-enabled device 125 is authorized to play music from "Provider X" and include the device authentication token in all queries so that all users can play music from "Provider X" (i.e., without need for a specific user token). In another example, if the speech-enabled device 125 does not store an authentication token for a known user that is authorized to play music from "Provider X," the speech-enabled device 125 may store a device authentication token that does not indicate that the speech-enabled device 125 is authorized to play music from "Provider X."

In some implementations, the speech-enabled device 125 may classify utterances as spoken by a particular user based on contextual information. Contextual information may include one or more of audio, visual, or other information. In regards to audio information, the speech-enabled device 125 may classify utterances based on speaker identification features (e.g., mel-frequency cepstral coefficients (MFCCs) features, which collectively can form a feature vector) of one or more utterances of a known user. For example, the speech-enabled device 125 may store speaker identification features for each of the known users speaking "OK Computer." In response to the speaker identification features in a currently received utterance sufficiently matching the stored speaker identification features of the known user "Dad" speaking "OK Computer," the speech-enabled device 125 may classify the utterance as spoken by the known user "Dad."

In another example, the speech-enabled device 125 may classify an utterance based on an entire audio of an utterance. For example, the speech-enabled device 125 may determine whether the speech in an entire received utterance matches speech corresponding to the known user "Dad."

In regards to visual information, the speech-enabled device 125 may receive one or more images of at least a portion of a speaker and attempt to recognize the speaker based on the one or more images. For example, the speech-enabled device 125 may include a camera and determine that a speaker within view of the camera has a face that the speech-enabled device 125 classifies as matching a face corresponding to the known user "Dad." In other examples, the speech-enabled device 125 may attempt to match one or more of the speaker's fingerprint, retina scan, facial recognition, posture, co-presence of another device, or confirmation of identity from another device or element of software.

The server 155 may receive a query from the speech-enabled device 125 and provide a response to the query to the speech-enabled device 125. For example, the server 155 may receive a query "OK Computer, what is on my calendar" and in response, provide the response, "Dad, you have one meeting today at 1 PM with John." The server 155 may provide a response to a query based on determining whether the query includes an indication of a known user and whether the query includes a question related to personal information, as shown in FIGS. 1A-1C and the accompanying description.

In more detail, the server 155 may initially determine whether a query indicates that an utterance was classified by the speech-enabled device 125 as being spoken by a known user. For example, where queries include a pool of all authentication tokens stored on a speech-enabled device 125, the server 155 may determine that a query includes a flag of "best-speaker" with a value of "True" for an authentication token of "Dad." In another example, where a query only includes an authentication token for a known user classified as speaking an utterance, the server 155 may determine that a query includes an authentication token of "Dad."

If the server 155 determines that the query indicates that an utterance was classified by the speech-enabled device 125 as being spoken by a known user, the server 155 may then process the query in relation to the known user. For example, for a query including an audio representation of the utterance "OK Computer, what is on my calendar" and indicating the known user "Dad," the server 155 may generate a transcription of "OK Computer, what is on my calendar" from the audio representation, access a calendar of the known user "Dad" based on the transcription, generate a response of "Dad, you have one meeting today at 1 PM with John" based on accessing the calendar, and provide the response to the speech-enabled device 125. Optionally, server 155 (or a module associated therewith) may use the known speaker identification and/or audio representation to rewrite the transcription. For example, knowing the speaker is "Dad," the server 155 may rewrite the query from "OK Computer, what is on my calendar" to "OK Computer, what is on [Dad]'s calendar".

If the server 155 determines that the query does not indicate that an utterance was classified by the speech-enabled device 125 as being spoken by a known user, the server 155 may determine whether the query is related to personal information. For example, the server 155 may determine that a query including an audio representation of the utterance "OK Computer, what is on my calendar" is related to personal information as the answer to the question is dependent on information that is personal to users (e.g., answering the query would requiring accessing a secure user account). In another example, the server 155 may determine that the query including an audio representation of the utterance "OK Computer, what time is it?" is not related to personal information as the answer to the question is not dependent on information that is personal to users.

If the server 155 determines that the query does not indicate that an utterance was classified by the speech-enabled device 125 as being spoken by a known user and determines that a query is related to personal information, the server 155 may determine not to provide an answer to the query (and optionally provide additional information, dialog, or a guide to possibly correcting the lack of recognition). For example, as shown in FIG. 1B with an utterance "OK Computer, what is on my calendar" spoken by a guest user, the server 155 provides a response of "I don't have access to your calendar, but did you know that it's national ice cream day today." (Or alternatively, "I don't have access to your calendar, but I can guide you through the registration process if you'd like.")

If the server 155 determines that the query does not indicate that an utterance was classified by the speech-enabled device 125 as being spoken by a known user and determines that a query is not related to personal information, the server 155 may determine to provide an answer to the query. For example, as shown in FIG. 1C with an utterance "OK Computer, what time is it" spoken by a guest user, the server 155 provides a response of "It's 11 AM."

Different configurations of the system 100 may be used where functionality of the speech-enabled device 125 and the server 155 may be combined, further separated, distributed, or interchanged. For example, instead of including an audio representation of the utterance in the query for the server 155 to transcribe, the speech-enabled device 125 may transcribe an utterance and include the transcription in the query to the server 155.

Figure 2:
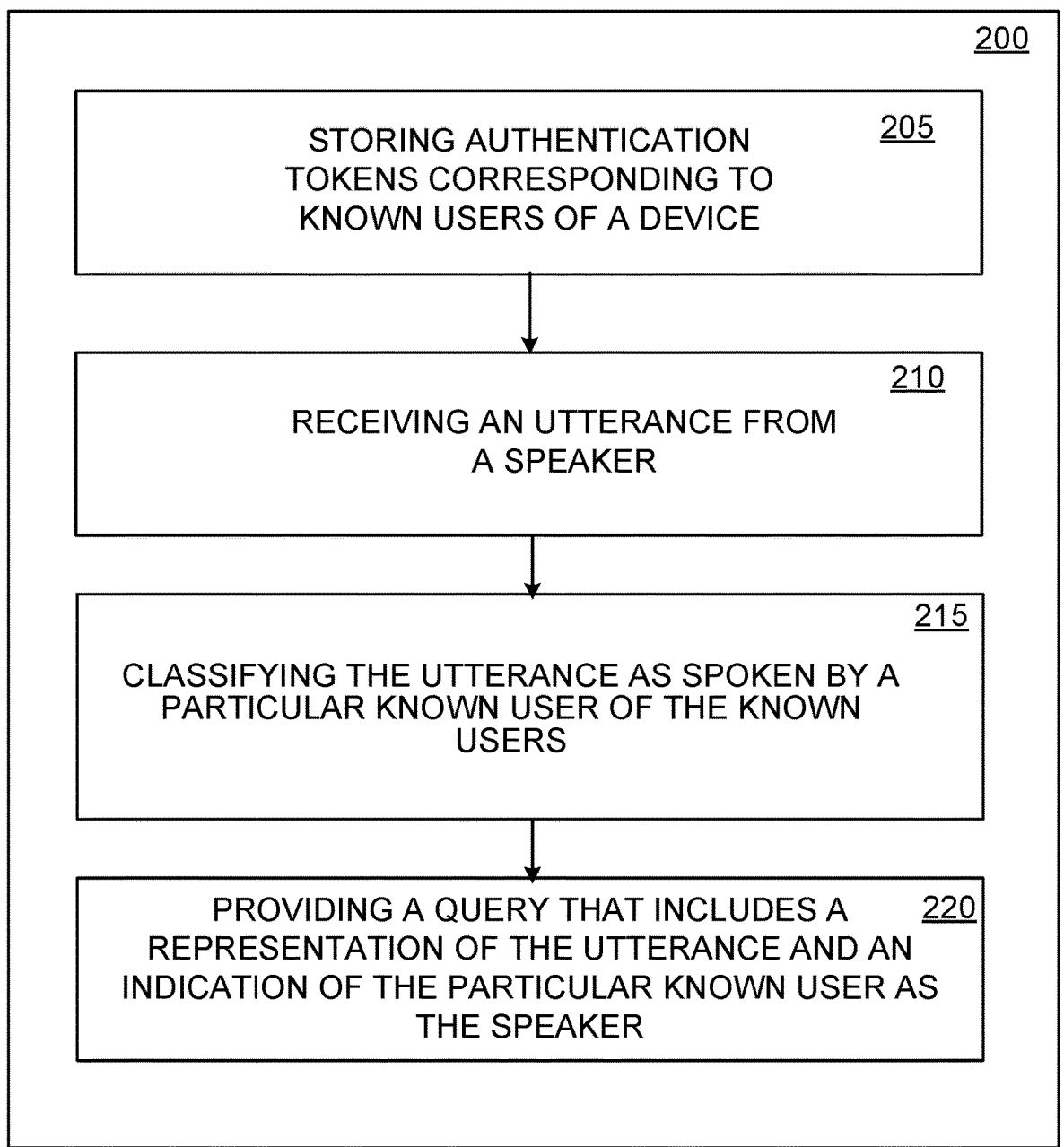
FIG. 2 is a flow diagram that illustrates an example of a process for handling an utterance from a known user.

FIG. 2 is a flow diagram that illustrates an example of a process 200 for handling an utterance from a known user. The operations of the process 200 may be performed by one or more computing systems, such as the system 100 of FIGS. 1A-1C.

The process 200 includes storing authentication tokens corresponding to known users of a device (205). For example, the speech-enabled device 125 may receive and store authentication tokens 132, 134, 136, 138, for known users "Mom," "Dad," "Matt," And "Kate," respectively. Each of the authentication tokens may correspond to a respective one of the known users. For example, a first authentication token 132 may correspond to first known user "Mom," a second authentication token 134 may correspond to a second known user "Dad," a third authentication token 136 may correspond to a third known user "Matt," and a fourth authentication token 138 may correspond to a fourth known user "Kate."

The speech-enabled device 125 may store the authentication tokens in response to users registering as known users of a speech-enabled device. For example, the authentication token for "Mom" may be stored by the speech-enabled device 125 in response to the speech-enabled device 125 receiving the authentication token from the server 155 after the server 155 receives an indication that "Mom" will be using the speech-enabled device 125.

The process 200 includes receiving an utterance from a speaker (210). For example, the speech-enabled device 125 may receive an utterance of "OK Computer, what is on my calendar" from a known user "Dad" through a microphone of the speech-enabled device 125.

The process 200 includes classifying the utterance as spoken by a particular known user of the known users (215). For example, the speech-enabled device 125 may classify an utterance as spoken by the known user "Dad." In some implementations, classifying the utterance as spoken by a particular known user of the known users includes determining that the utterance matches speech corresponding to the particular known user. For example, the speech-enabled device 125 may determine that speaker identification features of an utterance matches speaker identification features that were previously stored for "Dad."

In some implementations, determining that the utterance matches speech corresponding to the particular known user includes determining that the utterance includes a predetermined phrase and, in response to determining that the utterance of the predetermined phrase, determining that the utterance of the predetermined phrase matches a prior utterance of the predetermined phrase by the particular known user. For example, the speech-enabled device 125 may determine that the utterance includes the hotword "OK Computer" and, in response, determine whether just the speaker identification features of "OK Computer" in the utterance match speaker identification features that were previously stored for "Dad" saying "OK Computer."

In some implementations, classifying the utterance as spoken by a particular known user of the known users includes determining that visual information corresponding to the speaker matches visual information corresponding to the particular known user. For example, the speech-enabled device 125 may include a camera, capture an image of the speaker using the camera, and determine whether one or more of the speaker's fingerprint, retina scan, face, or posture, match corresponding visual information of "Dad."

The process 200 includes providing a query that includes a representation of the utterance and an indication of the particular known user as the speaker (220). For example, the speech-enabled device 125 may provide the server 155 a query that includes an audio representation of "OK Computer" and an indication that "Dad" is the speaker.

In some implementations, providing a query that includes a representation of the utterance and an indication of the particular known user as the speaker includes providing a query that includes the authentication tokens and a flag that indicates the utterance was classified as spoken by the particular known user. For example, the speech-enabled device 125 may provide the server 155 a query that includes all authentication tokens stored on the speech-enabled device 125 and an indication of "True" for a flag of "best-speaker" for the authentication token of "Dad."

In some implementations, providing a query that includes a representation of the utterance and an indication of the particular known user as the speaker includes providing a query that includes an authentication token only of the particular known user, where inclusion of the authentication token of the particular known user in the query indicates that the utterance was classified as spoken by the particular known user. For example, the speech-enabled device 125 may provide the server 155 a query that includes a single authentication token for "Dad."

Figure 3:
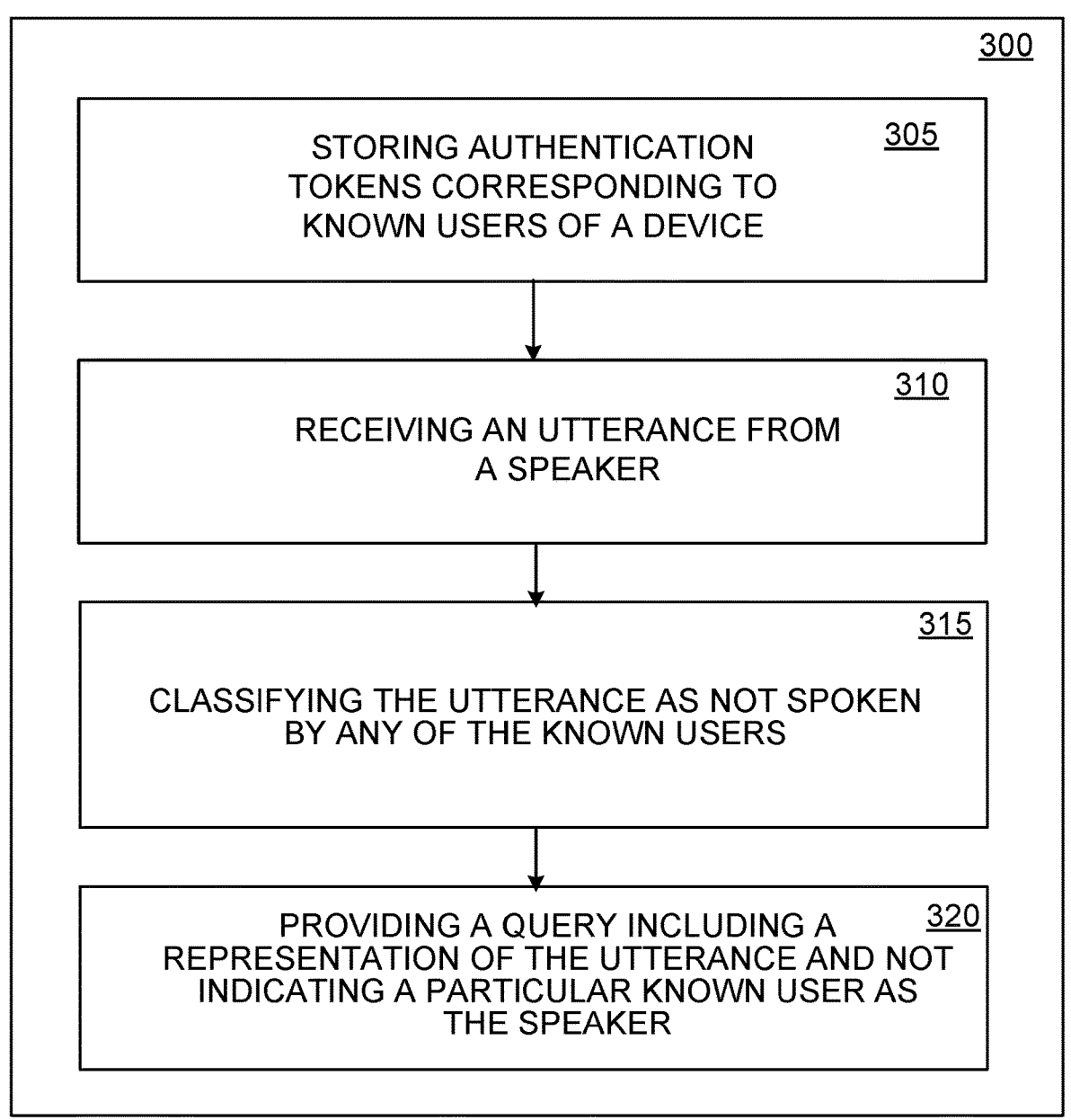
FIG. 3 is a flow diagram that illustrates an example of a process for handling an utterance from a guest user.

FIG. 3 is a flow diagram that illustrates an example of a process 300 for handling an utterance from a guest user. The operations of the process 300 may be performed by one or more computing systems, such as the system 100 of FIGS. 1A-1C.

The process 300 includes storing authentication tokens corresponding to known users of a device (305). For example, the speech-enabled device 125 may receive and store authentication tokens for known users "Mom," "Dad," "Matt," and "Kate."

The process 300 includes receiving an utterance from a speaker (310). For example, the speech-enabled device 125 may receive an utterance of "OK Computer, what is on my calendar" from a known user "Dad" through a microphone of the speech-enabled device 125.

The process 300 includes classifying the utterance as not spoken by any of the known users (315). For example, the speech-enabled device 125 may classify an utterance as not spoken by "Mom," "Dad," "Matt," or "Kate."

The process 300 includes providing a query that includes a representation of the utterance and not indicating a particular known user as the speaker (320). For example, the speech-enabled device 125 may provide the server 155 a query that includes an audio representation of "OK Computer" and no indication of "Mom," "Dad," "Matt," or "Kate" as the speaker. In some implementations, providing a query that includes a representation of the utterance and that does not indicate that the utterance was classified as spoken by a particular known user of the known users includes providing a query that includes the pool of authentication tokens and no flag that indicates the utterance was classified as spoken by a particular known user of the known users. For example, the speech-enabled device 125 may provide the server 155 a query that includes all authentication tokens stored on the speech-enabled device 125 and an indication of "False" for all flags of "best-speaker" for all the authentication tokens of the known users.

In some implementations, providing a query that includes a representation of the utterance and that does not indicate that the utterance was classified as spoken by a particular known user of the known users includes providing a query that does not include an authentication token of any of the known users. For example, the speech-enabled device 125 may provide the server 155 a query that does not include an authentication token for "Mom," "Dad," "Matt," or "Kate." Indeed, in such a case according to some embodiments the speech-enabled device 125 may provide the server 155 with a representation of the utterance and no token at all. According to other embodiments, tokens other than user authentication tokens may be provided to server 155 with a representation of the utterance, such as a device authentication token.

FIG. 4 is a flow diagram that illustrates an example of a process 400 for handling an utterance from a speech-enabled device. The operations of the process 400 may be performed by one or more computing systems, such as the system 100 of FIGS. 1A-1C.

The process 400 includes determining whether a query indicates a particular known user as a speaker (405). For example, the server 155 may determine that a query indicates that a known user "Dad" is the speaker for the query. In some implementations, determining whether a query indicates a particular known user as a speaker includes determining whether the query includes a flag that indicates the utterance was classified as spoken by the particular known user. For example, the server 155 may determine whether a flag of "best-speaker" for the authorization token of the known user "Dad" is set as "True." In some implementations, determining whether a query indicates a particular known user as a speaker includes determining whether the query includes an authorization token of the known user. For example, the server 155 may determine that the query includes an authorization token for the known user "Dad."

The process 400 includes in response to determining whether a query indicates a particular known user as a speaker, determining that the query is not from a known user (410). For example, the server 155 may determine that as no particular known user is the speaker for a query, then the query is from a guest user.

The process 400 includes in response to determining that the query is not from a known user, determining whether the query is non-personal (415). For example, in response to determining that the query is not from a known user, the server 155 may determine that the query for the utterance "OK Computer, what is on my calendar" is personal. In another example, in response to determining that the query is not from a known user, the server 155 may determine that the query for the utterance "OK Computer, what time is it"

is non-personal. In some implementations, determining whether the query is non-personal includes determining whether an answer to the query is dependent on personal information (e.g., requiring access to a secure user account). For example, the server 155 may determine that a query for "What is on my calendar" is personal as the answer is dependent on both who the user is and access to that user's personal information. In another example, may determine that a query "What time is it" is non-personal as the answer is not dependent on who the user is.

The process 400 includes in response to determining that the query is non-personal, attempting to provide a response to the query (420). For example, in response to determining that the query "What time is it" is non-personal, the server 155 may attempt to determine the current time and provide a response of "It's 11 AM" to the speech-enabled device 125.

Figure 5:
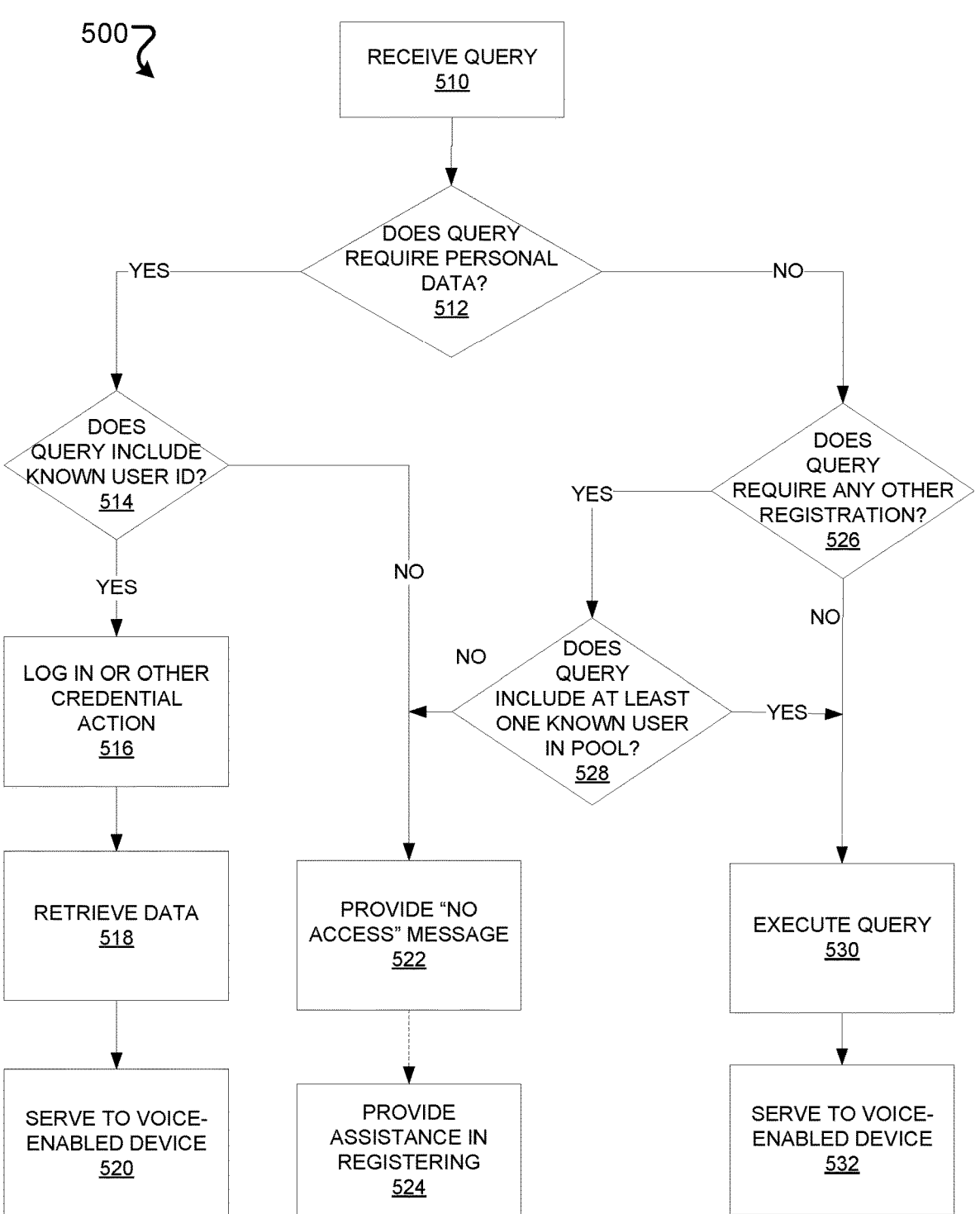
FIG. 5 is a flow diagram that illustrates another example of a process for handling a query from a speech-enabled device.

FIG. 5 is a flow diagram that illustrates an example of a process 500 for handling an utterance from a speech-enabled device. The operations of the process 500 may be performed by one or more computing systems, such as the system 100 of FIGS. 1A-1C.

The process 500 includes receiving a query (510). For example, the server 155 may receive a query including (i) a representation of the utterance "OK Computer, what is on my calendar," (ii) a pool of authentication tokens for known users, and (iii) an indication that a known user "Dad" spoke the utterance.

The process 500 includes determining does the query require personal data (512). For example, the server 155 may determine that "what is on my calendar" requires personal data of the speaker.

If the process 500 determines that the query does not require personal data, the process 500 includes determining does the query include a known user indication (514). For example, the server 155 may determine that a flag of "best-speaker" is set as true for any authentication token of "Dad."

If the process 500 determines that the query includes a known user indication, then the process 500 logs in or performs another credential action using the authentication token for the indicated known user (516), retrieves data (518), and serves to a voice-enabled device (520). For example, the server 155 logs into an account of "Dad" using the authentication token for "Dad," retrieves a calendar of "Dad," and provides a response to the speech-enabled device 125 with a summary of appointments for "Dad" based on retrieved calendar.

Returning to 514, if the process 500 instead determines that the query does not include a known user indication, the process includes providing a "no access" message (522). For example, the server 155 may provide the speech-enabled device 125 a response of "I don't have access to your calendar." After providing a "no access" message, the process 500 may include optionally providing assistance in registering (524). For example, the server 155 may provide the speech-enabled device 125 a response of "I can guide you through the registration process if you'd like."

Returning to 512, if the process 500 instead determines that the query does not require personal data, the process determines does the query require any other registration (526). For example, the server 155 may determine that handling a query to access a subscription based audio service requires registration of a known user with a subscription.

If the process 500 determines that the query does require other registration, the process 500 determines does the query includes at least one known user in a pool (528). For example, the server 155 may determine that no known user in a pool has a subscription to the audio service. If the process 500 determines that a pool does not include at least one known user, the process includes providing a "no access" message (522) and optionally provide assistance in registering (524).

Returning to 528, if the process 500 determines that the query includes at least one known user in a pool, the process 500 includes executing the query (530) and serving to the voice enabled device (532). For example, the server 155 accesses the subscription audio service and provides a response to the speech-enabled device 125 using the access to the subscription audio service.

Returning to 526, if the process 500 determines the query does not require any other registration, the process 500 includes executing the query (530) and serving to the voice enabled device (532). For example, the server 155 determines a query of "what time is it" does not require other registration and provides a response indicating the time.

While determining does the query require personal data (512) is shown first in the process 500, the process 500 may be different. For example, the process 500 may instead first determine does the query include a known user indication (514) and if no known user is indicated then determine does the query require personal data (512).

Figure 6:
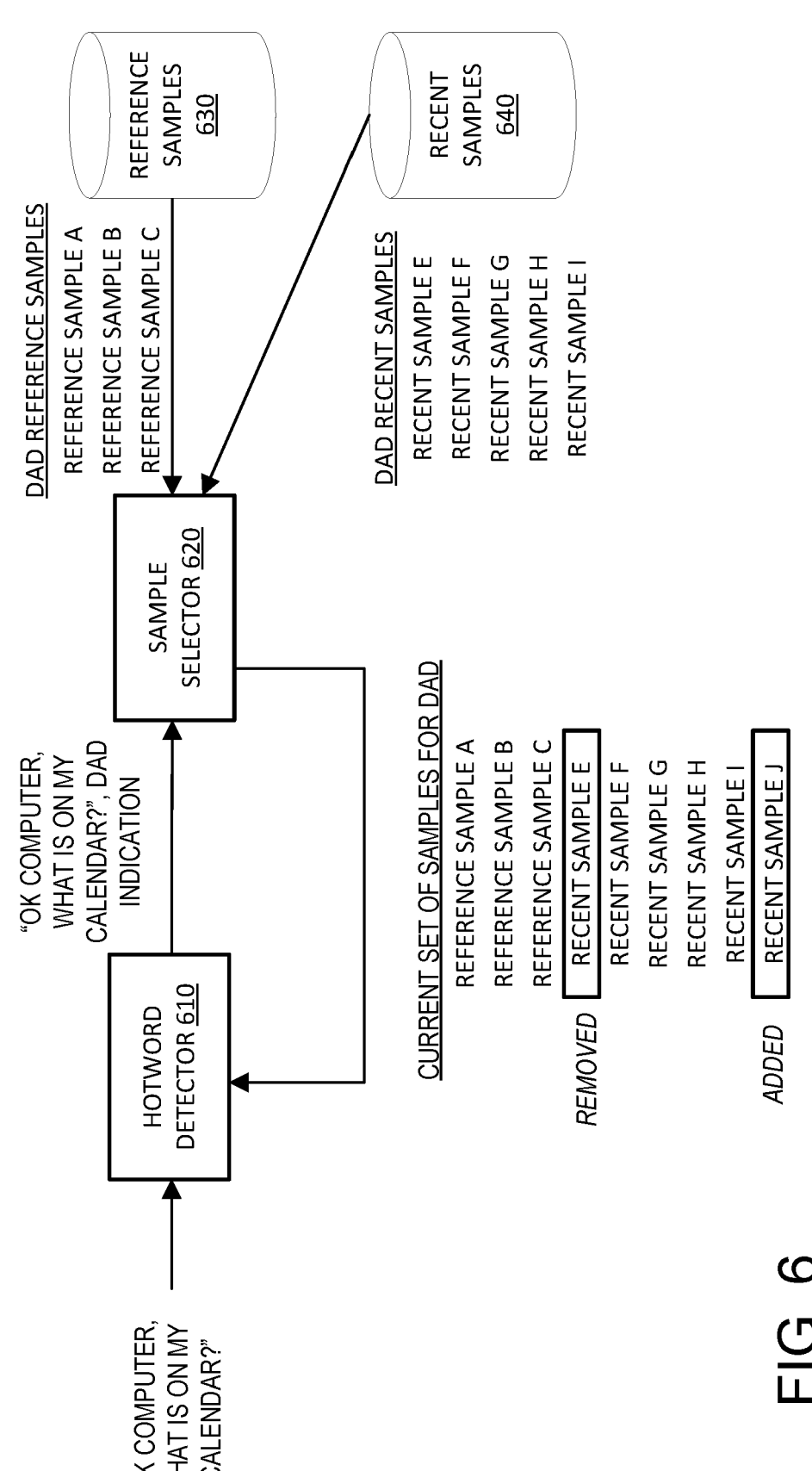
FIG. 6 is a block diagram that illustrates an example of updating a set of samples used for speaker identification.

FIG. 6 is a block diagram that illustrates an example of a system 600 updating a set of samples used for speaker identification. The system 600 includes a hotword detector 610, a sample selector 620, a reference sample data store 630, and a recent sample data store 640. In some implementations, the hotword detector 610 may be implemented on a speech-enabled device such as the speech-enabled device 125 described for system 100, and the sample selector 620, reference sample data store 630, and recent sample data store 640 may be implemented on a server such as the server 155 described for system 100. For example, the speech-enabled device 125 may include the hotword detector 610 and the speech-enabled device 125 may use the hotword detector 610 to determine whether a particular known user has spoken a hotword. In another example, both the hotword detector 610 and the sample selector 620 may be located on the speech-enabled device 125.

In some implementations to improve later detection of a particular known user saying a hotword after registration of the particular known user, the system 100 may store additional speaker identification features when a user later says a hotword when providing a query. For example, the known user "Dad" may say "OK Computer" three times during an initial registration and the speech-enabled device 125 may store speaker identification features for those three times. Later after registration when the known user "Dad" provides a query by saying "OK Computer," the speech-enabled device 125 may store additional speaker identification features for the using saying "OK Computer" for that query. Continuing the example, the speech-enabled device 125 may then use all four sets of speaker identification features to determine when the known user "Dad" later says "OK Computer."

While the use of speaker identification features is generally described here, audio recordings may similarly be used. For example, the speech-enabled device 125 may store four audio recordings corresponding to the known user "Dad" saying "OK Computer" and then use the four audio recordings to generate a hotword detection model that can be later used to detect the known user "Dad" speaking the hotword. The hotword detection model may even be generated based on speaker identification features extracted from the four audio recordings. Accordingly, the description herein of the system 100 storing and using speaker identification features to detect a known user speaking a hotword may similarly apply to storing and using audio recordings to detect a known user speaking a hotword, and vice versa.

Allowing the system 100 to use additional speaker identification features may enable the system 100 to more accurately detect when a speaker says a hotword as the system 100 may collect more samples of the known user saying the hotword. Additionally or alternatively, using additional speaker identification features of a user saying a hotword after registration may ensure that the system 100 may adapt to changes in how a user says a hotword. For example, the user's voice or way of pronouncing the hotword may slowly change across time.

In some implementations, the system 100 may use speaker identification features from a limited number of times that a known user says a hotword. For example, the speech-enabled device 125 may only use up to eight, ten, fifteen, or some other predetermined number, of audio recordings and corresponding speaker identification features. The speech-enabled device 125 may always use the speaker identification features from the known user speaking the hotword during registration and for the remainder of the predetermined number of audio recordings, use the most recent audio recordings of the user saying the hotword for a query. For example, the speech-enabled device 125 may only use eight total audio recordings for detection so use all three of the audio recordings of the known user saying the hotword during registration and use audio recordings of the five most recent times that the known user spoke the hotword.

However, as multiple users may use the speech-enabled device 125, the system 100 may determine to only use speaker identification features for later detection of a known user speaking the hotword if the system 100 is able to determine with a high confidence that the known user spoke the hotword. For example, the speech-enabled device 125 may determine that for a particular utterance of "OK Computer, play music," "OK Computer" wasn't spoken entirely like how a particular known user is expected to say the hotword. In response, the speech-enabled device 125 may determine a confidence score, that reflects how likely a particular known user spoke that utterance, is high enough to play music that the particular known user likes but not high enough for the speech-enabled device 125 to use for later detection of the hotword being spoken by the known user.

For speaker identification features that the user decides to use for later detection, the speech-enabled device 125 may label the speaker identification features or audio recordings with an indication when the speaker identification features or audio recordings was obtained. For example, the speech-enabled device 125 may label audio recordings with timestamps and use the timestamps to determine which audio recordings are the most recent audio recordings to use for detection.

The hotword detector 610 may determine and indicate whether the hotword was likely spoken by a particular user. For example, the hotword detector 610 may receive an audio representation of a known user "Dad" speaking "OK Computer, what is on my calendar," determine the known user "Dad" likely spoke the hotword "OK Computer," and, in response, provide an indication of "Dad" and the audio representation to the sample selector 620.

As described above in relation to the speech-enabled device 125, the hotword detector 610 may use a set of samples, e.g., one or more of speaker identification features or audio recordings, to detect whether a particular known user spoke the hotword. For example, the hotword detector 610 may be a neural network model trained using reference samples A-C and recent samples E-I to recognize the known user "Dad" speaking "OK Computer." A reference sample may be a sample that is obtained from a known user during a registration process and a recent sample may be a sample this is obtained from a query.

The sample selector 620 may obtain an audio representation and an indication that the audio representation corresponds to the known user likely speaking the hotword and, in response, store a portion of the audio representation as a new recent sample and obtain another set of samples from among the stored samples. For example, the sample selector 620 may obtain the audio representation of "OK Computer, what is on my calendar," generate a sample from the portion corresponding to "OK Computer" as recent sample J, and then select a new set of samples that includes reference samples A-C and recent samples F-J without including recent sample E in the new set.

The sample selector 620 may obtain another set of samples from reference samples in the reference sample data store 630 and recent samples in the recent sample data store 640. For example, the sample selector 620 may obtain reference samples A-C from the reference sample data store 630, obtain recent samples E-J from the recent sample data store 640, and then select the reference samples A-C and recent samples F-J.

Similarly as described above for the server 155, the sample selector 620 may select samples to use in a set of samples based on how recent the samples are. In some implementations, to reduce the amount of data transfer, storage, and processing needed for detection of hotword spoken by a known user, the hotword detector 610 may only user a limited number of samples for detection. For example, the hotword detector 610 may only use eight samples for detection. However, to allow for changes in a known user's way of speaking the hotword, e.g., a user is sick, a user is in a noisier environment, a user's accent has changed, the sample selector 620 may select samples that are more recently obtained. Additionally, as reference samples may be considered to have the most accurate representation of the known user speaking the hotword for providing a query, the sample selector may select a predetermined number of reference samples, e.g., three or all, and a predetermined number of the most recently obtained recent samples.

In some implementations, the sample selector 620 may determine the most recently obtained recent samples by labeling each sample when generated with an indication of when the sample was generated, e.g., a timestamp, and store the recent samples in the recent samples data store 640 along with the indications.

As shown in FIG. 6, after the sample selector 620 generates recent sample J from "OK Computer, what is on my calendar," the sample selector 620 may obtain a set including reference samples A-C and recent samples F-J by obtaining the reference samples A-C from the reference sample data store 630, obtaining the recent samples E-I from the recent sample data store 640, selecting all of the reference samples, selecting recent samples F-J based on determining that they are the five most recently generated recent samples out of recent samples E-J.

In some implementations, the hotword detector 610 may additionally or alternatively provide an indication of a confidence that a known user spoke the hotword and the sample selector may consider that confidence in determining whether to use a recent sample for the set of samples used in detection. For example, the sample selector 620 may use a confidence threshold of 95% so may not generate a new sample from an audio representation if the hotword detector 610 indicates any confidence less than 95% that the known user spoke the hotword in the audio representation.

The sample selector 620 may additionally or alternatively determine what type of device an audio representation is coming from, label recent samples with an indication of that type, and then consider the types when generating a new set of sample. For example, the sample selector 620 may determine that a table-top speech-enabled device is requesting a most current set of samples and, in response, select recent samples only from among recent samples labeled as coming from table-top speech-enabled devices. In another example, the sample selector 620 may determine that a television speech-enabled device is requesting a most current set of samples and, in response, determine and select the two most recent samples from a television speech-enabled device and the three most recent samples from among the recent samples not yet selected.

Additionally or alternatively, where the hotword detector is implemented on a speech-enabled device and the sample selector 620 is implemented on a server, the server may generate a model for detection based on the set of samples and then transmit the model to the speech-enabled device without providing the samples themselves to the speech-enabled device. For example, the server 155 may obtain a set of samples including reference samples A-C and recent samples F-J, train a hotword detection model using the set of samples, then transmit the trained hotword detection model to the speech-enabled device 125.

In some implementations, the system 100 may enable the speech-enabled device 125 to obtain speaker identification features of a particular known user speaking a hotword without needing to say a hotword if the system 100 already stores speaker identification features of the particular known user speaking the hotword. For example, during an initial registration after a user provides log-in information for an account to use with the speech-enabled device 125, the speech-enabled device 125 may determine that the server 155 has audio recordings stored of the user saying "OK Computer" three times during a prior registration on another speech-enabled device and, in response, request the audio recordings for the prior registration from the server 155 instead of prompting the particular known user to say "OK Computer" three times when registering.

By using stored speaker identification features, the system 100 may enable a user to quickly start using additional speech-enabled devices without needing to speak a hotword multiple times for registration on the additional speech-enabled device. For subsequent devices, the system 100 may instead use speaker identification features from prior audio recordings of the user saying "OK Computer" stored from registration with a first speech-enabled device. Additionally, as the various speech-enabled devices may all use the same speaker identification features, the system 100 may ensure that the various devices are consistent and uniform in detecting when the user says the hotword.

In a particular example, a user may register to use the speech-enabled device 125 through a companion application on a smartphone, indicate that the user would like to register as a known user of the speech-enabled device 125, provide log-in credentials for an account of the user in the companion application, and the companion application may request the server 155 determine whether the account of the user has audio recordings stored of the user saying the hotword "OK Computer." The server 155 may respond with an indication that there are stored audio recordings, e.g., a Boolean "True," and the companion application may, in response, skip a screen asking a user to say the hotword multiple times and instead send an instruction to the speech-enabled device 125 to request the audio recordings from the server 155. In response, the server 155 may then transmit the audio recordings to the speech-enabled device 125.

In some implementations, similarly to how the speech-enabled device 125 may use additional speaker identification features from a known user saying a hotword as part of a query for later detection of the hotword being spoken by the known user, speech-enabled devices in the system 100 may share such additional speaker identification features with one another so that all the speech-enabled devices may improve detection of the known user saying the hotword. For example, the user "Dad" may say "OK Computer, what are my appointments for the day" to the speech-enabled device 125 and the speech-enabled device 125 may generate an audio recording that is provided to a second speech-enabled device to use to detect the user "Dad" later saying "OK Computer."

In some implementations, the speech-enabled devices may share additional speaker identification features through the server 155. For example, each time the speech-enabled device 125 determines that the confidence score for an utterance of the hotword satisfies a predetermined confidence score threshold, the speech-enabled device 125 may provide the speaker identification features or audio recording of the known user saying the hotword to the server 155 along with the token for the particular known user stored on the speech-enabled device 125. The server 155 may identify the corresponding known user account and authenticate that the audio recording should be stored for the known user account based on the inclusion of the token, and then store the speaker identification features or audio recording on the server 155 and provide the speaker identification features or audio recordings to all other speech-enabled devices that the known user has registered as using. The other speech-enabled devices may then use the speaker identification features or audio recordings for later detection of the known user speaking the hotword.

In some implementations, the server 155 may provide the additional speaker identification features or audio recordings in response to requests from speech-enabled devices or without receiving requests from speech-enabled devices. For example, each time the speech-enabled device 125 is powered on or at predetermined intervals, e.g., hourly, daily, weekly, etc., the speech-enabled device 125 may provide a request to the server 155 that asks for any updates to audio recordings to use for detection. In another example, the server 155 may push additional audio recordings labeled with an indication of the particular known user each time the server 155 stores a new audio recording of the particular known user saying the hotword.

In some implementations, the system 100 may send entire sets of speaker identification features or audio recordings to speech-enabled devices. For example, the server 155 may receive a request for audio recordings to use to detect a known user saying "OK Computer" and, in response, provide three audio recordings from a registration of the known user and five of the most recent audio recordings of the known user saying "OK Computer" as part of a query.

In some implementations, the system 100 may attempt to reduce bandwidth usage by avoiding transmitting speaker identification features or audio recordings that speech-enabled devices already store. For example, the server 155 may receive a request for a current set of audio recordings from a particular speech-enabled device and send identifiers, e.g., unique alphanumeric text, for each of eight audio recordings. The particular speech-enabled device may then compare those identifiers with identifiers of audio recordings the speech-enabled device already has stored and only request the audio recordings for those identifiers that the speech-enabled device doesn't have stored. The server 155 may then provide those audio recordings that the speech-enabled device requested by identifier and the speech-enabled device may then use that set of audio recordings for later detection of a known user saying a hotword.

Additionally or alternatively, the system 100 may track which audio recordings each speech-enabled device has stored so that the speech-enabled devices do no need to request particular identification features or audio recordings. For example, the server 155 may receive a request for a current set of audio recordings from a particular speech-enabled device, determine that the particular speech-enabled device includes all but two new audio recordings of a set of eight audio recordings to use, and, in response, provide the speech-enabled device a set of identifiers for the eight audio recordings along with the two new audio recordings. The speech-enabled device may then delete any stored audio recordings with identifiers that don't match any identifiers in the set of identifiers and use the audio recordings with identifiers corresponding to the set for later detection of the hotword.

In some implementations, the confidence score for an utterance may be solely based on speaker identification features or audio recordings. For example, the speech-enabled device 125 may obtain speaker identification features for a current utterance, compare the speaker identification features to stored speaker identification features, and generate the confidence score directly from the comparison.

Alternatively, the confidence score for an utterance may be based on other factors. For example, the speech-enabled device 125 may determine whether another query was just received and take the average of the previous confidence score and an initial confidence score for the current utterance. In another example, the speech-enabled device 125 may determine that a user recently provided a passcode for the known user and, in response, generate a higher confidence score for the utterance than that which would be generated from the speaker identification features or audio recordings alone.

In some implementations, the system 100 may determine particular sets of audio recordings for a particular speech-enabled device to use based on characteristics of the particular speech-enabled device. For example, the server 155 may use only audio recordings with very high confidences for a speech-enabled device that is a mobile computing device that is likely to be carried in public and be exposed to utterances from many different people speaking the hotword. In another example, the server 155 may only use audio recordings generated by a table-top speech-enabled device for table-top speech-enabled devices. In this example, the server 155 may label audio recordings with information that indicates what type of devices generated the audio recordings so that the server 155 can later determine audio recordings to use for speech-enabled devices based on device type.

While the above description of FIG. 6 describes samples for the known user "Dad," the hotword detector 610 and sample selector 620 may similarly use samples for multiple other known users. The hotword detector 610 may obtain different sets of samples, where each set includes samples for a particular known user, and then determine whether a known user spoke a hotword in an utterance using the sets. For example, the hotword detector 610 may receive an utterance and, in parallel, use a first hotword detector model trained using a set of samples for the known user "Dad" and use a second hotword detector model trained using a set of samples for the known user "Mom," determine that the output of the second hotword detector model indicates a 97% confidence the known user "Mom" spoke the hotword "OK Computer" and the output of the second hotword detector model indicates a 8% confidence that the known user "Dad" spoke the hotword and, in response to determining that the 97% confidence is greater than a predetermined threshold of 95% and is greater than the 8% confidence, determine that the utterances includes the known user "Mom" speaking the hotword.

FIG. 7 is a flow diagram that illustrates an example of a process 700 for updating a set of samples used for speaker identification. The operations of the process 200 may be performed by one or more computing systems, such as the hotword detector 610 and sample selector 620 of FIG. 6.

The process 700 includes determining that an utterance includes a particular user speaking a hotword based at least on a first set of samples of the particular user speaking the hotword (705). For example, the hotword detector 610 may use the set of reference samples A-C and recent samples E-I to detect that an utterance includes a known user "Dad" speaking a hotword "OK Computer."

In some implementations, determining that an utterance includes a particular user speaking a hotword based at least on a first set of samples of the particular user speaking the hotword may include generating a hotword detection model using the first set of samples, inputting the utterance to the hotword detection model, and determining that the hotword detection model has classified the utterance as including the particular user speaking the hotword. For example, the hotword detector 610 may generate a hotword detection model using the first set of samples, input utterances into the hotword detection model, and then use the output from the hotword detection model as the hotword detector's output.

The process 700 includes in response to determining that an utterance includes a particular user speaking a hotword based at least on a first set of samples of the particular user speaking the hotword, storing at least a portion of the utterance as a new sample (710). For example, in response to receiving an indication from the hotword detector 610 that the known user "Dad" has spoken the hotword in an utterance, the sample selector 620 may store a portion of the utterance corresponding to "OK Computer" as a new recent sample J for the known user "Dad."

The process 700 includes obtaining a second set of samples of the particular user speaking the utterance, where the second set of samples includes the new sample and less than all the samples in the first set of samples (715). For example, the sample selector 620 may obtain a second set of samples that includes reference samples A-C and recent samples F-J, without including recent sample E.

In some implementations, obtaining a second set of samples of the particular user speaking the utterance, where the second set of samples includes the new sample and less than all the samples in the first set of samples may include selecting a predetermined number of recently stored samples as the second set of samples. For example, the sample selector 620 may select three, five, eight, or some other predetermined number of the most recently stored recent samples. In some implementations, obtaining a second set of samples of the particular user speaking the utterance, where the second set of samples includes the new sample and less than all the samples in the first set of samples may include selecting both a predetermined number of most recently stored samples and a set of reference samples to combine together as the second set of samples. For example, the sample selector 620 may select three, five, eight, or some other number of the most recently stored recent samples and select one, two, three, all, or some other number of the reference samples.

The process 700 includes determining that a second utterance includes the particular user speaking the hotword based at least on the second set of samples of the user speaking the hotword (720). For example, the hotword detector 610 may use the set of reference samples A-C and recent samples F-J, without recent sample E, to detect that an utterances includes a known user "Dad" speaking a hotword "OK Computer."

In some implementations, the process 700 includes in response to obtaining the second set of samples, deleting a sample in the first set of samples but not in the second set of samples. For example, after the sample selector 620 selects a second set without the recent sample E, the sample selector 620 may determine that no current sets for hotword detection include the recent sample E and, in response, instruct the recent sample data store 640 to delete the recent sample E.

In some implementations, the process 700 includes receiving a second new sample from a server and determining that a third utterance includes the particular user speaking the hotword based at least on a third set of samples that includes the second new sample from the server and less than all the samples in the second set of samples. For example, the hotword detector 610 may receive a recent sample K and then determine that another utterance includes a known user "Dad" saying "OK Computer" based on reference samples A-C and recent samples G-K.

In some implementations, the process 700 includes receiving, from a server, indications of samples in a third set of samples, determining samples that are in the third set of samples that are not locally stored, providing a request to server for the samples in the third set of samples that are not locally stored, and receiving the samples that are not locally stored from the server in response to the request. For example, the hotword detector 610 or speech-enabled device 125 may request a current set of samples from the server 155, in response, receive an indication that the current set of samples for the hotword detector 610 or speech-enabled device 125 includes the reference samples A-C and recent samples G-K, determine that reference samples A-C and recent samples G-J are already currently locally stored but recent sample K is not currently locally stored, provide a request to the server 155 for the recent sample K, and receive recent sample K in response to the request.

In some implementations, the process 700 includes providing the first set of samples to a voice-enabled device to enable the voice-enabled device to detect whether the particular user says the hotword, where determining that an utterance includes a particular user speaking a hotword based at least on a first set of samples of the particular user speaking the hotword includes receiving an indication that the voice-enabled device detected that the particular user said the hotword. For example, the server 155 may determine that an utterance includes a known user "Dad" speaking the hotword "OK Computer" based on receiving an audio representation from the speech-enabled device 125 and a token for the known user "Dad" flagged as the speaker.

In some implementations, the process 700 includes generating a hotword detection model using the first set of samples and providing the hotword detection model to a voice-enabled device to enable the voice-enabled device to detect whether the particular user says the hotword, where determining that an utterance includes a particular user speaking a hotword based at least on a first set of samples of the particular user speaking the hotword includes receiving an indication that the voice-enabled device detected that the particular user said the hotword. For example, the server 155 may generate a hotword detection model based on a set of samples and then provide the hotword detection model to the speech-enabled device 125.

In some implementations, the process 700 includes receiving, from a voice-enabled device, a request for a current set of samples for detecting whether the particular user said the hotword, determining samples in the current set of samples that are not locally stored by the voice-enabled device, and providing, to the voice-enabled device, an indication of the samples in the current set of samples and the samples in the current set of samples that are not locally stored by the voice-enabled device. For example, the server 155 may receive a request for a current set of samples from the speech-enabled device 125, determine which samples that the server 155 previously provided to the speech-enabled device 125, and then provide an indication of the samples in the current set of samples to the speech-enabled device 125 along with the samples that the server 155 determined that the server 155 had not yet provided to the speech-enabled device 125.

In some implementations, the system 600 may enable users to request to provide new reference samples. For example, the system 600 may receive a request from a user to reset samples stored for the user. The system 600 may receive a request to reset samples through a companion application on a smartphone used by the user, in response to the request, the system 600 may delete all reference samples stored for the user and request that the user say a hotword multiple times and generate new reference samples from the utterances. The system 600 may then generate a third set of samples that includes all the new reference samples and a predetermined number of the most recently stored recent samples. In another example, the system 600 may receive a request to reset samples through a companion application on a smartphone used by the user, in response to the request, the system 600 may delete all of both the reference and the recent samples stored for the user and request that the user say a hotword multiple times and generate new reference samples from the utterances. The system 600 may then generate a third set of samples that includes only the new reference samples.

Figure 8:
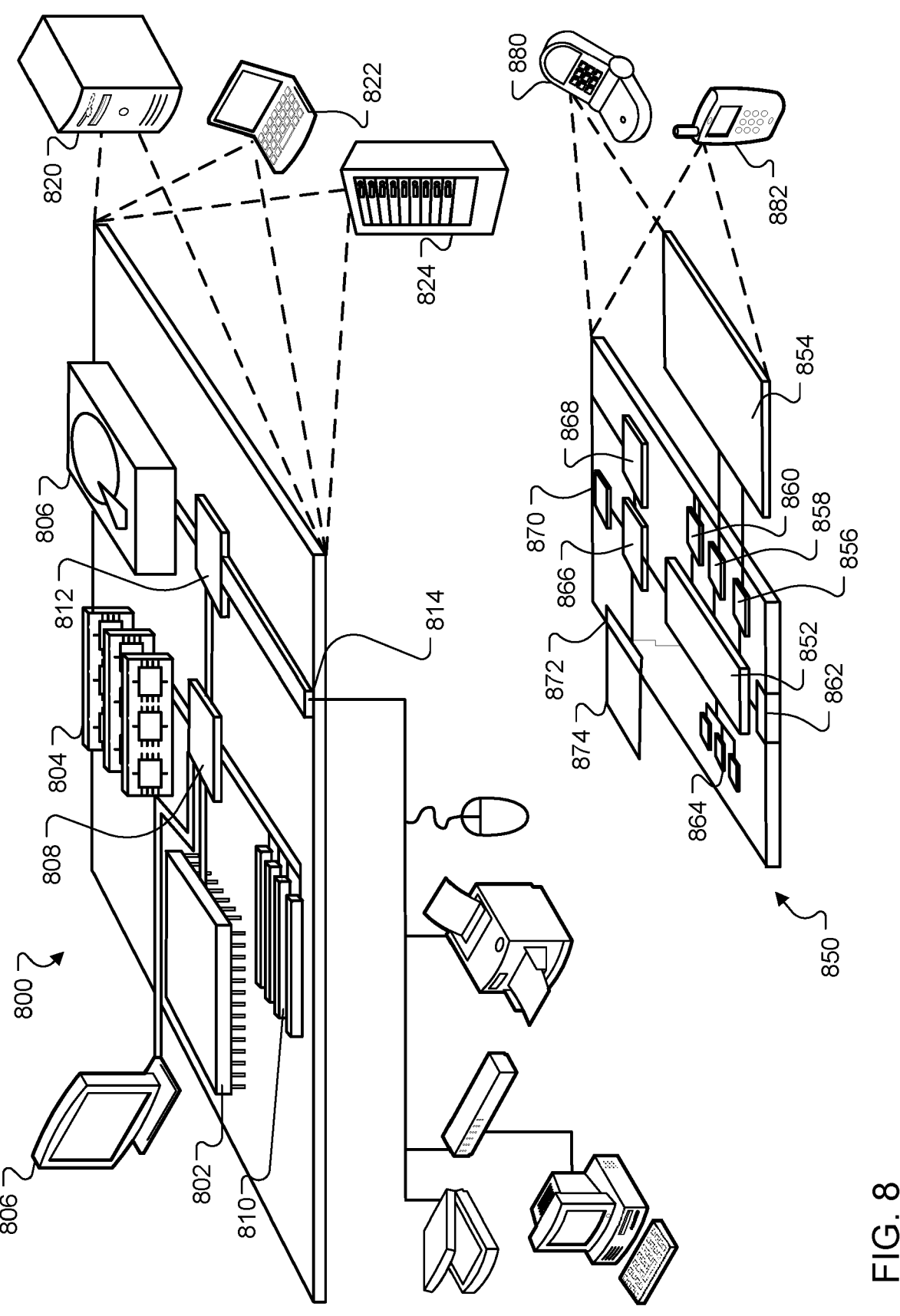
FIG. 8 is a diagram of examples of computing devices.

FIG. 8 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a graphical user interface (GUI) on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provided as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A method implemented by one or more processors, the method comprising:

receiving an utterance from a speaker, the utterance being captured in audio data generated by one or more microphones of a speech-enabled device;

determining, based on processing the audio data that captures the utterance, whether the utterance corresponds to a personal request or non-personal request;

in response to determining that the utterance corresponds to a personal request:

determining, based on processing the audio data that captures the utterance using one or more hotword detection models that were previously generated to recognize one or more known users of the speech-enabled device, whether the speaker is a known user of the speech-enabled device or not a known user of the speech-enabled device; and in response to determining that the speaker is not a known user of the speech-enabled device:

causing a registration process to be initiated that, when completed, results in the speaker being recognized as a known user of the speech-enabled device in response to receiving an additional utterance from the speaker; and during the registration process:

causing output to be provided for presentation to the speaker at the speech-enabled device that instructs the speaker to speak a particular word or phrase a particular number of times;

obtaining, responsive to causing the output to be provided for presentation to the speaker at the speech-enabled device, a set of audio recordings capturing utterances of the speaker that include the particular word or phrase; and generating, based on the set of audio recordings, an additional hotword detection model for use by the speech-enabled device in subsequently recognizing a voice of the speaker at the speech-enabled device.

2. The method of claim 1, further comprising:

in response to determining that the utterance corresponds to a non-personal request:

causing a response to the utterance to be provided for presentation to the speaker at the speech-enabled device responsive to the utterance, or causing an action to be performed by the speech-enabled device responsive to the utterance.

3. The method of claim 1, further comprising:

in response to determining that the speaker is a known user of the speech-enabled device:

causing a response to the utterance to be provided for presentation to the speaker at the speech-enabled device responsive to the utterance, or causing an action to be performed by the speech-enabled device responsive to the utterance.

4. The method of claim 1, further comprising:

subsequent to the registration process being completed:

receiving the additional utterance from the speaker, the additional utterance being captured in additional audio data generated by the one or more microphones of the speech-enabled device or one or more additional microphones of an additional speech-enabled device that is communicatively coupled to the speech-enabled device over a local area network;

determining, based on processing the additional audio data that captures the additional utterance, whether the additional utterance corresponds to a personal request or non-personal request;

in response to determining that the additional utterance corresponds to a personal request:

determining, based on processing the additional audio data that captures the additional utterance using at least the additional hotword detection model, whether the speaker is a known user of the speech-enabled device or the additional speech-enabled device, or not a known user of the speech-enabled device or the additional speech-enabled device; and in response to determining that the speaker is a known user of the speech-enabled device or the additional speech-enabled device:

causing a response to the additional utterance to be provided for presentation to the speaker at the speech-enabled device or the additional speech-enabled device responsive to the additional utterance, or causing an action to be performed by the speech-enabled device or the additional speech-enabled device responsive to the additional utterance.

5. The method of claim 1, further comprising:

prior to causing the registration process to be initiated:

causing a no access message to be provided for presentation to the speaker at the speech-enabled device responsive to the utterance that indicates:

a response to the utterance cannot be provided for presentation to the speaker at the speech-enabled device responsive to the utterance, or an action cannot be performed by the speech-enabled device responsive to the utterance.

6. The method of claim 1, wherein determining whether the speaker is a known user of the speech-enabled device or not a known user of the speech-enabled device comprises:

classifying, based on speaker identification features determined using one or more of the hotword detection models for one or more of the known users of the speech-enabled device, the speaker of the utterance as a known user of the speech-enabled device or not a known user of the speech-enabled device based on speaker identification features of the utterance.

7. The method of claim 1, wherein determining whether the speaker is a known user of the speech-enabled device or not a known user of the speech-enabled device comprises:

generating a query that includes speaker identification features determined using one or more of the hotword detection models and authentication tokens that correspond to one or more of the known users of the speech-enabled device;

transmitting the query to a remote server; and receiving, from the remote server, an indication of whether the speaker is a known user of the speech-enabled device or not a known user of the speech-enabled device.

8. The method of claim 1, wherein determining whether the utterance corresponds to a personal request or non-personal request comprises:

determining whether personal information of one or more of the known users of the speech-enabled device is needed to cause a response to be provided or to cause an action to be performed; and determining that the utterance is a non-personal request in response to determining the personal information of one or more of known users of the speech-enabled device is not needed to cause the response to be provided or to cause the action to be performed.

9. The method of claim 1, wherein determining whether the utterance corresponds to a personal request or non-personal request comprises:

generating a query that includes at least a representation of the utterance;

transmitting the query to a remote server; and receiving, from the remote server, an indication of whether the utterance corresponds to a personal request or non-personal request.

10. The method of claim 1, wherein a personal request is dependent on personal information of one or more of the known users of the speech-enabled device, and wherein a non-personal request is not dependent on the personal information of any of the one or more known users of the speech-enabled device.

11. The method of claim 1, during the registration process, further comprising:

causing the set of audio recording capturing utterances of the speaker to be provided to an additional speech-enabled device, wherein causing the set of audio recordings capturing utterances of the speaker to be provided to the additional speech-enabled device causes the additional speech-enabled device to:

generate, based on the set of audio recordings, a further additional hotword recognition model for use by the additional speech-enabled device in subsequently recognizing the voice of the speaker at the additional speech-enabled device.

12. The method of claim 11, wherein providing the set of audio recordings to the additional speech-enabled device is performed in response to determining that the additional speech-enabled device does not already store the set of audio recordings.

13. The method of claim 11, wherein providing the set of audio recordings to the additional speech-enabled device is performed in response to determining that a type of the speech-enabled device matches a type of the additional speech-enabled device.

14. The method of claim 11, wherein providing the set of audio recordings to the additional speech-enabled device is performed in response to the additional speech-enabled device:

determining that the speech-enabled device received the set of audio recordings, and requesting the set of audio recordings.

15. A speech-enabled device comprising:

one or more processors; and memory storing instructions that, when executed by the one or more processors, cause the one or more processors to:

receive an utterance from a speaker, the utterance being captured in audio data generated by one or more microphones of a speech-enabled device;

determine, based on processing the audio data that captures the utterance, whether the utterance corresponds to a personal request or non-personal request;

in response to determining that the utterance corresponds to a personal request:

determine, based on processing the audio data that captures the utterance using one or more hotword detection models that were previously generated to recognize one or more known users of the speech-enabled device, whether the speaker is a known user of the speech-enabled device or not a known user of the speech-enabled device; and in response to determining that the speaker is not a known user of the speech-enabled device:

cause a registration process to be initiated that, when completed, results in the speaker being recognized as a known user of the speech-enabled device in response to receiving an additional utterance from the speaker; and during the registration process:

cause output to be provided for presentation to the speaker at the speech-enabled device that instructs the speaker to speak a particular word or phrase a particular number of times;

obtain, responsive to causing the output to be provided for presentation to the speaker at the speech-enabled device, a set of audio recordings capturing utterances of the speaker that include the particular word or phrase; and generate, based on the set of audio recordings, an additional hotword detection model for use by the speech-enabled device in subsequently recognizing a voice of the speaker at the speech-enabled device.

16. A non-transitory computer-readable storage medium storing instructions that, when executed by one or more processors, cause the one or more processors to perform operations, the operations comprising:

receiving an utterance from a speaker, the utterance being captured in audio data generated by one or more microphones of a speech-enabled device;

determining, based on processing the audio data that captures the utterance, whether the utterance corresponds to a personal request or non-personal request;

in response to determining that the utterance corresponds to a personal request:

determining, based on processing the audio data that captures the utterance using one or more hotword detection models that were previously generated to recognize one or more known users of the speech-enabled device, whether the speaker is a known user of the speech-enabled device or not a known user of the speech-enabled device; and in response to determining that the speaker is not a known user of the speech-enabled device:

causing a registration process to be initiated that, when completed, results in the speaker being recognized as a known user of the speech-enabled device in response to receiving an additional utterance from the speaker; and during the registration process:

causing output to be provided for presentation to the speaker at the speech-enabled device that instructs the speaker to speak a particular word or phrase a particular number of times;

obtaining, responsive to causing the output to be provided for presentation to the speaker at the speech-enabled device, a set of audio recordings capturing utterances of the speaker that include the particular word or phrase; and generating, based on the set of audio recordings, an additional hotword detection model for use by the speech-enabled device in subsequently recognizing a voice of the speaker at the speech-enabled device.

<p style="text-align:center">*    *    *    *    *</p>